United States Patent
Chong et al.

(10) Patent No.: US 10,575,207 B2
(45) Date of Patent: Feb. 25, 2020

(54) DATA SERVICE CONTROL METHOD AND RELATED DEVICE

(71) Applicant: HUAWEI TECHNOLOGIES CO., LTD., Shenzhen (CN)

(72) Inventors: Weiwei Chong, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/198,920

(22) Filed: Nov. 23, 2018

(65) Prior Publication Data
US 2019/0098528 A1 Mar. 28, 2019

Related U.S. Application Data

(63) Continuation of application No. PCT/CN2016/096508, filed on Aug. 24, 2016.

(30) Foreign Application Priority Data

May 25, 2016 (WO) .............. PCT/CN2016/083378
Jul. 5, 2016 (WO) .............. PCT/CN2016/088585

(51) Int. Cl.
*H04W 28/02* (2009.01)
*H04W 4/24* (2018.01)
(Continued)

(52) U.S. Cl.
CPC ..... *H04W 28/0215* (2013.01); *H04L 12/1482* (2013.01); *H04L 65/1016* (2013.01);
(Continued)

(58) Field of Classification Search
CPC ... H04W 28/0215; H04W 76/30; H04W 4/24; H04W 88/16; H04L 12/1482; H04L 65/1016; H04M 15/39; H04M 15/41
(Continued)

(56) References Cited

U.S. PATENT DOCUMENTS

2008/0032684 A1 2/2008 Yagyu et al.
2012/0109800 A1 5/2012 Zhou et al.
(Continued)

FOREIGN PATENT DOCUMENTS

CN 101547142 A 9/2009
CN 101651907 A 2/2010
(Continued)

OTHER PUBLICATIONS

S2-163129 Orange et al., "Study on PS Data off function", 3GPP SA WG2 Meeting #115, May 23-27, 2016, Nanjing, P. R. China, total 5 pages.
(Continued)

*Primary Examiner* — William Nealon
(74) *Attorney, Agent, or Firm* — Kilpatrick Townsend & Stockton LLP

(57) ABSTRACT

A data service control method and a related device are disclosed. The method includes: determining, by a PGW, a status of a data service switch of UE; if the status of the data service switch is that the data service switch is turned off, after the PGW receives a first data packet that comes from or goes to the UE, determining, by the PGW, whether the first data packet belongs to a specified type; and forwarding, by the PGW, the first data packet if the first data packet belongs to the specified type; or discarding, by the PGW, the first data packet if the first data packet does not belong to the specified type. During implementation of embodiments of the present disclosure, when the data service switch of the UE is turned off, data traffic of the UE can be saved.

18 Claims, 10 Drawing Sheets

(51) Int. Cl.
H04W 76/30 (2018.01)
H04L 12/14 (2006.01)
H04M 15/00 (2006.01)
H04L 29/06 (2006.01)
H04W 88/16 (2009.01)

(52) U.S. Cl.
CPC .......... H04M 15/39 (2013.01); H04M 15/41 (2013.01); H04W 4/24 (2013.01); H04W 76/30 (2018.02); H04W 88/16 (2013.01)

(58) Field of Classification Search
USPC ........................................................ 370/329
See application file for complete search history.

(56) References Cited

U.S. PATENT DOCUMENTS

| | | | |
|---|---|---|---|
| 2015/0036592 A1 | 2/2015 | Yoshida | |
| 2015/0264106 A1* | 9/2015 | Baek | H04W 48/18 709/203 |
| 2016/0119870 A1* | 4/2016 | Chang | H04L 63/0272 455/426.1 |
| 2016/0261754 A1* | 9/2016 | Keller | H04L 65/1016 |
| 2017/0126618 A1* | 5/2017 | Bhaskaran | H04L 61/2007 |
| 2017/0155772 A1* | 6/2017 | Chong | H04W 4/24 |
| 2017/0230819 A1 | 8/2017 | Zu et al. | |

FOREIGN PATENT DOCUMENTS

| | | | |
|---|---|---|---|
| CN | 101720076 A | 6/2010 | |
| CN | 101945368 A | 1/2011 | |
| CN | 105025589 A | 11/2015 | |
| EP | 3163918 A1 | 5/2017 | |
| JP | 2008042557 A | 2/2008 | |
| WO | 2013128884 A1 | 9/2013 | |
| WO | 2015035232 A2 | 3/2015 | |
| WO | 2015158363 A1 | 10/2015 | |
| WO | WO 2015/158363 A1 * | 10/2015 | ............ H04L 12/58 |
| WO | 2016023159 A1 | 2/2016 | |
| WO | 2016065639 A1 | 5/2016 | |

OTHER PUBLICATIONS

S2-163907 Huawei et al.,"Support for P-CSCF sending a response to UE or IMS network when receiving Bearer Setup Request Rejection for QCI=1", SA WG2 Meeting #S2-116,Jul. 11-15, 2016, Vienna, Austria, (revision of S2-163896/S2-163384),total 4 pages.

S2-163906 Huawei et al.,"Robust Call Setup for VoLTE subscriber in LTE",SA WG2 Meeting #S2-116,Jul. 11-15, 2016, Vienna, Austria,(revision of S2-163894/S2-163381),total 6 pages.

C1-160797 Alcatel-Lucent et al.,"Additional ePDG selection considerations and corrections",3GPP TSG-CT WG1 Meeting #95bis,Nashville, USA Jan. 11-15, 2016, (was C1-160777),total 4 pages.

3GPP TS 23.228 V14.0.0 (Jun. 2016),3rd Generation Partnership Project;Technical Specification Group Services and System Aspects;IP Multimedia Subsystem (IMS);Stage 2(Release 14),total 316 pages.

3GPP TS 23.237 V14.0.0 (Jun. 2016),3rd Generation Partnership Project;Technical Specification Group Services and System Aspects;IP Multimedia Subsystem (IMS) Service Continuity;Stage 2(Release 14),total 174 pages.

3GPP TS 24.292 V13.3.0 (Jun. 2016),3rd Generation Partnership Project;Technical Specification Group Core Network and Terminals;IP Multimedia (IM) Core Network (CN) subsystemCentralized Services (ICS);Stage 3(Release 13),total 183 pages.

3GPP TS 24.229 V14.0.1 (Jun. 2016),3rd Generation Partnership Project;Technical Specification Group Core Network and Terminals;IP multimedia call control protocol based onSession Initiation Protocol (SIP)and Session Description Protocol (SDP);Stage 3(Release 14),total 932 pages.

3GPP TS 23.401 V14.0.0 (Jun. 2016),3rd Generation Partnership Project;Technical Specification Group Services and System Aspects;General Packet Radio Service (GPRS) enhancements for Evolved Universal Terrestrial Radio Access Network (E-UTRAN) access(Release 14),total 374 pages.

3GPP TS 23.060 V14.0.0 (Jun. 2016),3rd Generation Partnership Project;Technical Specification Group Services and System Aspects;General Packet Radio Service (GPRS);Service description;Stage 2(Release 14),total 363 pages.

3GPP TS 23.203 V14.0.0 (Jun. 2016),3rd Generation Partnership Project;Technical Specification Group Services and System Aspects;Policy and charging control architecture(Release 14),total 245 pages.

3GPP TS 32.298 V13.4.0 (Jun. 2016),3rd Generation Partnership Project;Technical Specification Group Services and System Aspects;Telecommunication management;Charging management;Charging Data Record (CDR) parameter description(Release 13),total 204 pages.

3GPP TR 23.702 V0.1.0 (Jul. 2016),3rd Generation Partnership Project;Technical Specification Group Services and System Aspects;Study on 3GPP PS Data Off;(Release 14),total 17 pages.

3GPP TS 22.011 V14.3.0 (Jun. 2016),3rd Generation Partnership Project;Technical Specification Group Services and System Aspects;Service accessibility(Release 14),total 31 pages.

* cited by examiner

DATA SERVICE CONTROL METHOD AND RELATED DEVICE

CROSS-REFERENCE TO RELATED APPLICATIONS

This application is a continuation of International Application No. PCT/CN2016/096508, filed on Aug. 24, 2016, which claims priority to International Application No. PCT/CN2016/088585, filed on Jul. 5, 2016 and International Application No. PCT/CN2016/083378, filed on May 25, 2016. All of the aforementioned patent applications are hereby incorporated by reference in their entireties.

TECHNICAL FIELD

The present disclosure relates to the field of communications technologies, and in particular, to a data service control method and a related device.

BACKGROUND

As a mainstream communications technology, Long Term Evolution (LTE for short) may provide a faster data service than a second generation (2G for short) network and a third generation (3G for short) network do. In an LTE data service, data packets of various data services are all transferred on an uplink or downlink data transmission channel established between user equipment (UE for short), an access network, a core network, and a packet data network PDN for short).

To avoid an unnecessary data traffic loss caused by a factor such as a user misoperation or malicious software, a data service switch is disposed for a majority of UEs, and is configured to enable or disable a data service function of the UE. When a user does not need a data service, the user may turn off the data service switch. When a user needs a data service, the user may turn on the data service switch. When the user turns off the data service switch of the UE, the UE usually forbids sending a data packet to a network side by using software and hardware methods, and suspends sending uplink data packets of all data services of the UE. However, a downlink data packet from the network side to the UE may still be sent to the UE on the data transmission channel. This brings an unnecessary data traffic charge for the UE, causing a waste of data traffic of the UE.

SUMMARY

This application discloses a data service control method and a related device, to save data traffic of UE.

A first aspect discloses a data service control method, including:

determining, by a packet data network gateway PGW, a status of a data service switch of user equipment UE, where the status of the data service switch includes that the data service switch is turned on or that the data service switch is turned off;

after the status of the data service switch is that the data service switch is turned off, and the PGW receives a first data packet that comes from or goes to the UE, determining, by the PGW, whether the first data packet belongs to a specified type; and forwarding, by the PGW, the first data packet if the first data packet belongs to the specified type; or discarding, by the PGW, the first data packet if the first data packet does not belong to the specified type.

After the status of the data service switch of the UE is that the data service switch is turned off, the PGW discards an unnecessary data packet that comes from or goes to the UE, thereby avoiding an unnecessary charge for the UE, and saving data traffic of the UE. In addition, the PGW continues to forward a necessary data packet (for example, a data packet of the specified type) without affecting an important service and management of an IP address after the data service switch of the UE is turned off.

With reference to the first aspect, in a first implementation of the first aspect, before the determining, by the PGW, whether the first data packet belongs to a specified type, the method further includes:

determining, by the PGW, whether a service registration status of the UE is An IP multimedia subsystem IMS registration state; and when the PGW determines that the service registration status of the UE is the IMS registration state, determining, by the PGW, whether the first data packet belongs to the specified type.

With reference to the first implementation of the first aspect, in a second implementation of the first aspect, after the PGW determines that the service registration status of the UE is the IMS registration state, the method further includes:

when the status of the data service switch of the UE is that the data service switch is turned off, sending, by the PGW, a first status notification message to a IP multimedia subsystem IMS network, where the first status notification message is used to notify the IMS network that the status of the data service switch of the UE is that the data service switch is turned off.

With reference to the first aspect, or the first or the second implementation of the first aspect, in a third implementation of the first aspect, after the forwarding, by the PGW, the first data packet, the method further includes:

notifying, by the PGW, a charging system that the status of the data service switch of the UE is that the data service switch is turned off.

With reference to the third implementation of the first aspect, in a fourth implementation of the first aspect, the notifying, by the PGW, a charging system that the status of the data service switch of the UE is that the data service switch is turned off includes: adding, by the PGW, first indication information to a charging data record CDR generated according to the first data packet, where the first indication information is used to notify the charging system that the data service switch of the UE is turned off; or notifying, by the PGW in a first credit control request (CCR for short) message, the charging system that the data service switch of the UE is turned off.

With reference to any one of the first aspect or the first to the fourth implementations of the first aspect, in a fifth implementation of the first aspect, the determining, by the PGW, whether the first data packet belongs to a specified type includes:

determining, by the PGW, whether the first data packet includes one or more of the following data packets:

an uplink data packet that is sent by the UE to a packet data network PDN network corresponding to an IMS access point name APN or a downlink data packet that is sent by a PDN network corresponding to an IMS APN to the UE;

a data packet coming from an address of a specified service server and going to the UE;

a data packet used to manage an IP address; and a data packet of a specified service type.

With reference to the fifth implementation of the first aspect, in a sixth implementation of the first aspect, the determining, by the PGW, whether the first data packet is a data packet of a specified service type includes:

performing, by the PGW, deep packet inspection DPI on the first data packet, and determining whether the first data packet is the data packet of the specified service type; or determining, by the PGW based on service type indication information included in the first data packet, whether the first data packet is the data packet of the specified service type.

With reference to any one of the first aspect or the first to the sixth implementations of the first aspect, in a seventh implementation of the first aspect, after the forwarding, by the PGW, the first data packet if the first data packet belongs to the specified type; or discarding, by the PGW, the first data packet if the first data packet does not belong to the specified type, the method further includes:

after the status of the data service switch is that the data service switch is turned on, and the PGW receives a second data packet that comes from or goes to the UE, forwarding, by the PGW, the second data packet.

With reference to the seventh implementation of the first aspect, in an eighth implementation of the first aspect, after the PGW determines that the service registration status of the UE is the IMS registration state, the method further includes:

when the status of the data service switch of the UE is that the data service switch is turned on, sending, by the PGW, a second status notification message to the IP multimedia subsystem IMS network, where the second status notification message is used to notify the IMS network that the status of the data service switch of the UE is that the data service switch is turned on.

With reference to the seventh or the eighth implementation of the first aspect, in a ninth implementation of the first aspect, after the forwarding, by the PGW, the second data packet, the method further includes:

notifying, by the PGW, the charging system that the status of the data service switch of the UE is that the data service switch is turned on.

With reference to the ninth implementation of the first aspect, in a tenth implementation of the first aspect, the notifying, by the PGW, the charging system that the status of the data service switch of the UE is that the data service switch is turned on includes:

adding, by the PGW, second indication information to a charging data record CDR generated according to the second data packet, where the second indication information is used to notify the charging system that the data service switch of the UE is turned on; or notifying, by the PGW in a second CCR message, the charging system that the data service switch of the UE is turned on.

A second aspect discloses a data service control method, including:

determining, by a packet data network gateway PGW, a status of a data service switch of user equipment UE, where the status of the data service switch includes that the data service switch is turned on or that the data service switch is turned off;

after the status of the data service switch is that the data service switch is turned off, and the PGW receives a first data packet that comes from or goes to the UE, determining, by the PGW, whether a service registration status of the UE is only a circuit switched fallback CSFB combined registration state or only an evolved packet system EPS registration state, where only the CSFB combined registration state includes a state that the UE is registered with both a circuit switched CS network and an EPS network, but is not registered with an IP multimedia subsystem IMS network; and if the service registration status of the UE is only the CSFB combined registration state or only the EPS registration state, discarding, by the PGW, the first data packet.

After the status of the data service switch of the UE is that the data service switch is turned off, the PGW discards an unnecessary data packet that comes from or goes to the UE, thereby avoiding an unnecessary charge for the UE.

A third aspect discloses a data service control method, including:

determining, by a packet data network gateway PGW, a status of a data service switch of user equipment UE, where the status of the data service switch includes that the data service switch is turned on or that the data service switch is turned off; and after the status of the data service switch is that the data service switch is turned off, and the PGW receives a first data packet that comes from or goes to the UE, forwarding, by the PGW, the first data packet, and adding first indication information to a charging data record CDR generated according to the first data packet, where the first indication information is used to notify a charging system that the data service switch of the UE is turned off.

After the status of the data service switch of the UE is that the data service switch is turned off, the PGW forwards a necessary data packet (for example, a data packet of a specified type) without affecting an important service and management of an IP address after the data service switch of the UE is turned off. In addition, indication information used to notify the charging system that the data service switch of the UE is turned off is added to a charging data record CDR generated according to the forwarded data packet. When the first data packet is forwarded, the PGW may notify the charging system that the data service switch of the UE is turned off, so that the charging system charges for the first data packet according to a charging standard used after the data service switch of the UE is turned off, and the charging system determines whether to charge for the first data packet.

With reference to the third aspect, in a first implementation of the third aspect, before the forwarding, by the PGW, the first data packet, the method further includes:

determining, by the PGW, that a service registration status of the UE is an IMS registration state.

With reference to the third aspect or the first implementation of the third aspect, in a second implementation of the third aspect, after the forwarding, by the PGW, the first data packet, and adding first indication information to a charging data record CDR generated according to the first data packet, the method further includes:

if the status of the data service switch is that the data service switch is turned on, after the PGW receives a second data packet that comes from or goes to the UE, forwarding, by the PGW, the second data packet, and adding second indication information to a CDR generated according to the second data packet, where the second indication information is used to notify the charging system that the data service switch of the UE is turned on.

After the status of the data service switch of the UE is switched from being turned off to being turned on, the PGW may resume an original charging operation.

With reference to the third aspect or the first implementation of the third aspect, in a third implementation of the third aspect, the determining, by a PGW, a status of a data service switch of UE includes:

receiving, by the PGW, a protocol configuration option PCO that is sent by the UE by using a mobility management entity MME, where the PCO includes data service switch status indication information, and the data service switch status indication information is used to indicate the status of the data service switch of the UE.

The PGW determines the status of the data service switch of the UE based on the data service switch status indication information in the PCO sent by the UE, and when the status of the data service switch of the UE changes, the PGW may be notified of the status of the data service switch of the UE in time.

A fourth aspect discloses a data service control method, including:

sending, by UE, a service establishment message to a mobility management entity MME, where the service establishment message includes data service switch status indication information and/or service registration status indication information, the data service switch status indication information is used to indicate a status of a data service switch of the UE to a PGW, the service registration status indication information is used to indicate a service registration status of the UE, and the status of the data service switch includes that the data service switch is turned on or that the data service switch is turned off.

When a change occurs in the status of the data service switch and/or the service registration status of the UE, the UE may notify the status of the data service switch and/or the service registration status of the UE to the PGW in time.

With reference to the fourth aspect, in a first implementation of the fourth aspect, the method further includes:

when the UE moves from a Long Term Evolution network to a 2/3G network, accessing, by the UE, the 2/3G network; and when the UE determines that the status of the data service switch of the UE is that the data service switch is turned off, sending, by the UE, a Packet Data Protocol PDP deactivation message to a serving GPRS support node SGSN of the 2/3G network, to delete a PDP context of the UE; or sending, by the UE, a routing area update message to a serving GPRS support node SGSN of the 2/3G network, where the routing area update message carries the status of the data service switch of the UE.

With reference to the first implementation of the fourth aspect, in a second implementation of the fourth aspect, the method further includes:

when the UE moves from the 2/3G network to the Long Term Evolution network, accessing, by the UE, the Long Term Evolution network; and when the UE determines that the status of the data service switch of the UE is that the data service switch is turned off, sending, by the UE, an attach message to the MME.

A fifth aspect discloses a data service control method, including:

sending, by UE, a service establishment message to an MME, where the service establishment message includes data service switch status indication information, the data service switch status indication information is used to indicate a status of a data service switch of the UE to a PGW, and the status of the data service switch includes that the data service switch is turned on or that the data service switch is turned off.

When the status of the data service switch of the UE changes, the UE may notify the status of the data service switch of the UE to the PGW in time.

With reference to the fifth aspect, in a first implementation of the fifth aspect, the sending, by UE, a service establishment message to an MME includes:

when the UE determines that the status of the data service switch changes, sending, by the UE, the service establishment message including the data service switch status indication information to the MME.

When the status of the data service switch of the UE changes, the UE may notify the status of the data service switch of the UE to the PGW in time.

With reference to the fifth aspect or the first implementation of the fifth aspect, in a second implementation of the fifth aspect, the service establishment message includes a protocol configuration option PCO, where the PCO includes the data service switch status indication information.

The UE may transmit the status of the data service switch of the UE by using the PCO, thereby improving transmission security.

With reference to the fifth aspect, or the first or the second implementation of the fifth aspect, in a third implementation of the fifth aspect, the service establishment message includes one or more of an attach request message, a bearer resource change message, and a PDN connection establishment request message.

A sixth aspect discloses a data service control method, including:

after user equipment UE receives an operation instruction for disabling a data service, sending, by the UE, a packet data network PDN disconnection request to a core network device, so that the core network device deletes another PDN connection of the UE, where the another PDN connection includes a PDN connection established by the UE other than a PDN connection corresponding to an IP multimedia subsystem IMS access point name APN.

After a data service switch of the UE is turned off, the another PDN connection is deleted, and only the IMS APN PDN connection is reserved, thereby ensuring that an IMS service can be normally performed.

With reference to the sixth aspect, in a first implementation of the sixth aspect, after the sending, by the UE, a packet data network PDN disconnection request to a core network device, so that the core network device deletes another PDN connection of the UE, the method further includes:

if the UE does not establish the PDN connection corresponding to the IMS APN, sending, by the UE, an attach request message to the core network device, to trigger the UE to attach to a Long Term Evolution LTE network, where the attach request message carries indication information for requesting to establish the PDN connection corresponding to the IMS APN, so that the core network device requests, based on the PDN connection corresponding to the IMS APN, to establish the PDN connection corresponding to the IMS APN.

After the another PDN connection of the UE is deleted, if no IMS APN PDN connection is established, the UE initiates establishment of the IMS APN PDN connection. After the data service switch of the UE is turned off, it is still ensured that the IMS service can be normally performed.

With reference to the sixth aspect or the first implementation of the sixth aspect, in a second implementation of the sixth aspect, after the sending, by the UE, a packet data network PDN disconnection request to a core network device, so that the core network device deletes another PDN connection of the UE, the method further includes:

if the UE receives an operation instruction for enabling a data service, sending, by the UE, a PDN connection establishment request to the core network device, so that the core network device re-establishes the another PDN connection.

After a status of the data service switch of the UE is switched from being turned off to being turned on, the another PDN connection of the UE is re-established, thereby ensuring that all services are not affected and can be normally performed after the data service switch of the UE is turned on.

With reference to the sixth aspect or the first implementation of the sixth aspect, in a third implementation of the sixth aspect, after the sending, by the UE, a packet data network PDN disconnection request to a core network device, so that the core network device deletes another PDN connection of the UE, the method further includes:

when the UE needs to send an uplink data packet related to a specified service, if the specified service is based on the another PDN connection, prompting, by the UE, a user that a current data service has been disabled.

The specified service may be preset by a network-side device (such as an HSS, a P-CSCF, or an AF) and sent to the UE. Alternatively, the specified service may be preset and stored by the UE based on a service registration status of the UE. After the data service switch of the UE is turned off, if the specified service is based on the another PDN connection, the user may be prompted in time that the current data service has been disabled.

With reference to the third implementation of the sixth aspect, in a fourth implementation of the sixth aspect, the method further includes:

after the UE receives an operation instruction for enabling a data service, stopping, by the UE, the operation of prompting the user that the current data service has been disabled.

After the status of the data service switch of the UE is switched from being turned off to being turned on, prompting the user that the current data service has been disabled is stopped, and the UE resumes a normal operation.

With reference to the sixth aspect or the first implementation of the sixth aspect, in a fifth implementation of the sixth aspect, after the sending, by the UE, a packet data network PDN disconnection request to a core network device, so that the core network device deletes another PDN connection of the UE, the method further includes:

if the UE has established the PDN connection corresponding to the IMS APN, when the UE needs to send an uplink data packet related to a specified service, transmitting, by the UE by using the PDN connection corresponding to the IMS APN, the uplink data packet related to the specified service.

After the data service switch of the UE is turned off, if the UE has established the IMS APN PDN connection, the uplink data packet related to the specified service may be transmitted by using the IMS APN PDN connection, thereby ensuring that the specified service can be normally performed.

With reference to the fifth implementation of the sixth aspect, in a sixth implementation of the sixth aspect, the transmitting, by the UE by using the PDN connection corresponding to the IMS APN, the uplink data packet related to the specified service includes:

if the specified service is based on the another PDN connection, modifying, by the UE, a source IP address and a source port number of the uplink data packet related to the specified service to a source IP address and a source port number that correspond to the PDN connection corresponding to the IMS APN, so that a packet data network gateway PGW of the PDN connection corresponding to the IMS APN receives the uplink data packet that is related to the specified service and that is sent by the UE, and sends, based on a destination IP address and a destination port number of the uplink data packet related to the specified service, the uplink data packet related to the specified service to an application server corresponding to the specified service.

After the data service switch of the UE is turned off, if the UE has established the IMS APN PDN connection, the uplink data packet related to the specified service may be transmitted by using the IMS APN PDN connection and by modifying an IP 5-tuple, thereby ensuring that the specified service can be normally performed.

With reference to the fifth or the sixth implementation of the sixth aspect, in a seventh implementation of the sixth aspect, the method further includes:

after the UE receives the operation instruction for enabling a data service, resuming, by the UE, transmission of the uplink data packet related to the specified service by using the another PDN connection.

After the status of the data service switch of the UE is switched from being turned off to being turned on, the UE resumes a normal operation.

With reference to any one of the sixth aspect or the first to the seventh implementations of the sixth aspect, in an eighth implementation of the sixth aspect, the core network device includes:

a mobility management entity MME, a serving gateway SGW, or a PGW.

A seventh aspect discloses a data service control method, including:

after UE receives an operation instruction for disabling a data service, receiving, by an MME, a PDN disconnection request sent by the UE, and deleting another PDN connection of the UE, where the another PDN connection includes a PDN connection established by the UE other than a PDN connection corresponding to an IMS APN; or receiving, by the MME, a service establishment message sent by the UE, where the service establishment message includes data service switch status indication information and/or service registration status indication information, and forwarding, by the MME, the data service switch status indication information and/or the service registration status indication information to an SGW or a PGW, where the data service switch status indication information is used to indicate a status of a data service switch of the UE, the status of the data service switch includes that the data service switch is turned on or that the data service switch is turned off, and the service registration status indication information is used to indicate a service registration status of the UE.

When the data service switch of the UE is turned off, the MME may delete the another PDN connection of the UE in time. The another PDN connection includes the PDN connection established by the UE other than the PDN connection corresponding to the IMS APN. The MME may alternatively receive the service establishment message sent by the UE. The service establishment message includes the data service switch status indication information and/or the service registration status indication information. The MME may further forward the data service switch status indication information and/or the service registration status indication information to the SGW or the PGW. The MME may notify, in time, a core network device such as the SGW or the PGW that the data service switch of the UE has been turned off.

With reference to the seventh aspect, in a first implementation of the seventh aspect, the receiving, by the MME, a service establishment message sent by the UE, where the service establishment message includes data service switch status indication information and/or service registration status indication information, and forwarding, by the MME, the data service switch status indication information and/or the service registration status indication information to an SGW or a PGW includes: receiving, by the MME, an attach request message sent by the UE, where the attach request message includes the data service switch status indication information; and forwarding, by the MME, the data service switch status indication information to the SGW or the PGW, where the data service switch status indication information is used to notify the SGW or the PGW that a data service of the UE has been disabled.

When the data service switch of the UE is turned off, the MME may receive the attach request message that includes the data service switch status indication information and that is sent by the UE. The data service switch status indication information is used to notify the SGW or the PGW that the data service of the UE has been disabled. The MME may notify, in time, the core network device such as the SGW or the PGW that the data service switch of the UE has been turned off.

With reference to the seventh aspect, in a second implementation of the seventh aspect, the receiving, by the MME, a service establishment message sent by the UE, where the service establishment message includes data service switch status indication information and/or service registration status indication information, and forwarding, by the MME, the data service switch status indication information and/or the service registration status indication information to an SGW or a PGW includes:

receiving, by the MME, a first bearer resource change message sent by the UE, where the first bearer resource change message includes data service switch status indication information; and forwarding, by the MME, the data service switch status indication information to the SGW or the PGW, where the data service switch status indication information is used to notify the SGW or the PGW that the data service of the UE has been disabled.

When the data service switch of the UE is turned off, the MME may receive the first bearer resource change message that includes the data service switch status indication information and that is sent by the UE. The data service switch status indication information is used to notify the SGW or the PGW that the data service of the UE has been disabled. The MME may notify, in time, the core network device such as the SGW or the PGW that the data service switch of the UE has been turned off.

With reference to the seventh aspect, in a third implementation of the seventh aspect, the receiving, by the MME, a service establishment message sent by the UE, where the service establishment message includes data service switch status indication information and/or service registration status indication information, and forwarding, by the MME, the data service switch status indication information and/or the service registration status indication information to an SGW or a PGW includes:

receiving, by the MME, a PDN connection establishment request message sent by the UE, where the PDN connection establishment request message includes data service switch status indication information; and forwarding, by the MME, the data service switch status indication information to the SGW or the PGW, where the data service switch status indication information is used to notify the SGW or the PGW that the data service of the UE has been disabled.

When the data service switch of the UE is turned off, the MME may receive the PDN connection establishment request message that includes the data service switch status indication information and that is sent by the UE. The data service switch status indication information is used to notify the SGW or the PGW that the data service of the UE has been disabled. The MME may notify, in time, the core network device such as the SGW or the PGW that the data service switch of the UE has been turned off.

With reference to any one of the seventh aspect or the first to the third implementations of the seventh aspect, in a fourth implementation of the seventh aspect, the method further includes:

after the UE receives an operation instruction for enabling a data service, receiving, by the MME, a PDN connection establishment request sent by the UE, to re-establish the another PDN connection.

After the data service switch of the UE is turned on again, the MME may re-establish the another PDN connection, thereby ensuring that a service based on the another PDN connection can be normally performed.

With reference to any one of the seventh aspect or the first to the third implementations of the seventh aspect, in a fifth implementation of the seventh aspect, after the forwarding, by the MME, the data service switch status indication information and/or the service registration status indication information to an SGW or a PGW, the method further includes:

after the UE receives an operation instruction for enabling a data service, receiving, by the MME, a second bearer resource change message sent by the UE, where the second bearer resource change message includes the data service switch status indication information; and forwarding, by the MME, the data service switch status indication information to the SGW or the PGW, where the data service switch status indication information is used to notify the SGW or the PGW that the data service of the UE has been enabled.

After the data service switch of the UE is turned on, the MME may notify, in time, the core network device such as the SGW or the PGW that the data service switch of the UE has been turned on.

With reference to the first implementation of the seventh aspect, in a sixth implementation of the seventh aspect, the receiving, by the MME, an attach request message sent by the UE, where the attach request message includes the data service switch status indication information; and forwarding, by the MME, the data service switch status indication information to the SGW or the PGW includes:

receiving, by the MME, the attach request message sent by the UE, where the attach request message includes a PCO, and the PCO carries the data service switch status indication information; and forwarding, by the MME, the PCO to the SGW or the PGW, so that the SGW or the PGW obtains the data service switch status indication information from the PCO.

After the data service switch of the UE is turned off, the MME may notify, in time by using the PCO in the attach request message, the core network device such as the SGW or the PGW that the data service switch of the UE has been turned off.

With reference to the second implementation of the seventh aspect, in a seventh implementation of the seventh aspect, the receiving, by the MME, a first bearer resource change message sent by the UE, where the first bearer resource change message includes data service switch status indication information; and forwarding, by the MME, the data service switch status indication information to the SGW or the PGW includes:

receiving, by the MME, the first bearer resource change message sent by the UE, where the first bearer resource change message includes a PCO, and the PCO carries the data service switch status indication information; and forwarding, by the MME, the PCO to the SGW or the PGW, so that the SGW or the PGW obtains the data service switch status indication information from the PCO.

After the data service switch of the UE is turned off, the MME may notify, in time by using the PCO in the first bearer resource change message, the core network device such as the SGW or the PGW that the data service switch of the UE has been turned off.

With reference to the third implementation of the seventh aspect, in an eighth implementation of the seventh aspect, the receiving, by the MME, a PDN connection establishment request message sent by the UE, where the PDN connection establishment request message includes data service switch status indication information; and forwarding, by the MME, the data service switch status indication information to the SGW or the PGW includes:

receiving, by the MME, the PDN connection establishment request message sent by the UE, where the PDN connection establishment request message includes a PCO, and the PCO carries the data service switch status indication information; and forwarding, by the MME, the PCO to the SGW or the PGW, so that the SGW or the PGW obtains the data service switch status indication information from the PCO.

After the data service switch of the UE is turned off, the MME may notify, in time by using the PCO in the PDN connection establishment request message, the core network device such as the SGW or the PGW that the data service switch of the UE has been turned off.

An eighth aspect discloses a PGW, including a processor and a network interface, where the network interface is configured to receive a first data packet that comes from or goes to UE;

the processor is configured to determine a status of a data service switch of the user equipment UE, where the status of the data service switch includes that the data service switch is turned on or that the data service switch is turned off;

the processor is further configured to: after the processor determines that the status of the data service switch is that the data service switch is turned off, and the network interface receives the first data packet that comes from or goes to the UE, determine whether the first data packet belongs to a specified type;

the processor is further configured to forward the first data packet when the processor determines that the first data packet belongs to the specified type; and the processor is further configured to discard the first data packet when the processor determines that the first data packet does not belong to the specified type.

With reference to the eighth aspect, in a first implementation of the eighth aspect, before the processor determines whether the first data packet belongs to the specified type, the processor is further configured to determine whether a service registration status of the UE is an IP multimedia subsystem IMS registration state; and when the PGW determines that the service registration status of the UE is the IMS registration state, the processor determines whether the first data packet belongs to the specified type.

With reference to the first implementation of the eighth aspect, in a second implementation of the eighth aspect, the processor is further configured to: after the processor determines that the service registration status of the UE is the IMS registration state, when the status of the data service switch of the UE is that the data service switch is turned off, send a first status notification message to a IP multimedia subsystem IMS network by using the network interface, where the first status notification message is used to notify the IMS network that the status of the data service switch of the UE is that the data service switch is turned off.

With reference to the eighth aspect, or the first or the second implementation of the eighth aspect, in a third implementation of the eighth aspect, the processor is further configured to:

after the processor forwards the first data packet, notify, by using the network interface, a charging system that the status of the data service switch of the UE is that the data service switch is turned off.

With reference to the third implementation of the eighth aspect, in a fourth implementation of the eighth aspect, a manner used by the processor to notify, by using the network interface, the charging system that the status of the data service switch of the UE is that the data service switch is turned off is in some embodiments:

adding, by the processor, first indication information to a charging data record CDR generated according to the first data packet, where the first indication information is used to notify the charging system that the data service switch of the UE is turned off; or notifying, by the processor in a first credit control request CCR message, the charging system that the data service switch of the UE is turned off.

With reference to any one of the eighth aspect or the first to the fourth implementations of the eighth aspect, in a fifth implementation of the eighth aspect, that the processor determines whether the first data packet belongs to the specified type is in some embodiments:

the processor determines whether the first data packet includes one or more of the following data packets:

an uplink data packet that is sent by the UE to a packet data network PDN network corresponding to an IMS access point name APN or a downlink data packet that is sent by a PDN network corresponding to an IMS APN to the UE;

a data packet coming from an address of a specified service server and going to the UE;

a data packet used to manage an IP address; and a data packet of a specified service type.

With reference to the fifth implementation of the eighth aspect, in a sixth implementation of the eighth aspect, that the processor determines whether the first data packet is the data packet of the specified service type is in some embodiments:

the processor performs deep packet inspection DPI on the first data packet, and determines whether the first data packet is the data packet of the specified service type; or the processor determines, based on service type indication information included in the first data packet, whether the first data packet is the data packet of the specified service type.

With reference to any one of the eighth aspect or the first to the sixth implementations of the eighth aspect, in a seventh implementation of the eighth aspect, the network interface is further configured to receive a second data packet that comes from or goes to the UE; and the processor is further configured to: after the processor determines that the status of the data service switch is switched from the state that the data service switch is turned off to the state that the data service switch is turned on, and the network interface receives the second data packet that comes from or goes to the UE, forward the second data packet.

With reference to the seventh implementation of the eighth aspect, in an eighth implementation of the eighth aspect, the processor is further configured to:

after the processor determines that the service registration status of the UE is the IMS registration state, when the status of the data service switch of the UE is that the data service switch is turned on, send a second status notification message to the IP multimedia subsystem IMS network by using the network interface, where the second status notification message is used to notify the IMS network that the status of the data service switch of the UE is that the data service switch is turned on.

With reference to the seventh or the eighth implementation of the eighth aspect, in a ninth implementation of the eighth aspect, the processor is further configured to: after forwarding the second data packet, notify, by using the network interface, the charging system that the status of the data service switch of the UE is that the data service switch is turned on.

With reference to the ninth implementation of the eighth aspect, in a tenth implementation of the eighth aspect, a manner used by the processor to notify, by using the network interface, the charging system that the status of the data service switch of the UE is that the data service switch is turned on is in some embodiments:

adding, by the processor, second indication information to a charging data record CDR generated according to the second data packet, where the second indication information is used to notify the charging system that the data service switch of the UE is turned on; or notifying, by the processor in a second CCR message, the charging system that the data service switch of the UE is turned on.

A ninth aspect discloses a PGW, including a processor and a network interface, where the network interface is configured to receive a first data packet that comes from or goes to UE;

the processor is configured to determine a status of a data service switch of the user equipment UE;

the processor is further configured to: after the processor determines that the status of the data service switch is that the data service switch is turned off, and the network interface receives the first data packet that comes from or goes to the UE, determine whether a service registration status of the UE is only a circuit switched fallback CSFB combined registration state or only an evolved packet system EPS registration state; and the processor is further configured to: when the processor determines that the service registration status of the UE is only the CSFB combined registration state or only the EPS registration state, discard the first data packet, where the status of the data service switch includes that the data service switch is turned on or that the data service switch is turned off, and only the CSFB combined registration state includes a state that the UE is registered with both a circuit switched CS network and an EPS network, but is not registered with an IP multimedia subsystem IMS network.

A tenth aspect discloses a PGW, including a processor and a network interface, where the network interface is configured to receive a first data packet that comes from or goes to UE;

the processor is configured to determine a status of a data service switch of the user equipment UE, where the status of the data service switch includes that the data service switch is turned on or that the data service switch is turned off; and the processor is further configured to: after the status of the data service switch is that the data service switch is turned off, and the network interface receives the first data packet that comes from or goes to the UE, forward the first data packet, and add first indication information to a charging data record CDR generated according to the first data packet, where the first indication information is used to notify a charging system that the data service switch of the UE is turned off.

With reference to the tenth aspect, in a first implementation of the tenth aspect, the processor is further configured to: before forwarding the first data packet, determine that a service registration status of the UE is an IMS registration state.

With reference to the tenth aspect or the first implementation of the tenth aspect, in a second implementation of the eighth aspect, the network interface is further configured to receive a second data packet that comes from or goes to the UE; and the processor is further configured to: after the status of the data service switch is that the data service switch is turned on, and the network interface receives the second data packet that comes from or goes to the UE, forward the second data packet, and add second indication information to a CDR generated according to the second data packet, where the second indication information is used to notify the charging system that the data service switch of the UE is turned on.

With reference to the tenth aspect or the first implementation of the tenth aspect, in a third implementation of the tenth aspect, that the processor determines the status of the data service switch of the UE is in some embodiments:

the processor receives a protocol configuration option PCO that is sent by the UE by using a mobility management entity MME, where the PCO includes data service switch status indication information, and the data service switch status indication information is used to indicate the status of the data service switch of the UE.

An eleventh aspect discloses UE, including a processor and a network interface, where the network interface is configured to send a service establishment message to an MME; and the processor is configured to send the service establishment message to the MME by using the network interface, where the service establishment message includes data service switch status indication information and/or service registration status indication information, the data service switch status indication information is used to indicate a status of a data service switch of the UE to a PGW, the service registration status indication information is used to indicate a service registration status of the UE, and the status of the data service switch includes that the data service switch is turned on or that the data service switch is turned off.

With reference to the eleventh aspect, in a first implementation of the eleventh aspect, when the UE moves from a Long Term Evolution network to a 2/3G network, the UE accesses the 2/3G network; and when the processor determines that the status of the data service switch of the UE is that the data service option is turned off, the UE sends a Packet Data Protocol PDP deactivation message to a serving GPRS support node SGSN of the 2/3G network by using the network interface, to delete a PDP context of the UE; or the UE sends a routing area update message to a serving GPRS support node SGSN of the 2/3G network by using the network interface, where the routing area update message carries the status of the data service option of the UE.

With reference to the first implementation of the eleventh aspect, in a second implementation of the eleventh aspect, when the UE moves from the 2/3G network to the Long Term Evolution network, the UE accesses the Long Term Evolution network; and when the processor determines that the status of the data service switch of the UE is that the data service option is turned off, the UE sends an attach message to the MME by using the network interface.

A twelfth aspect discloses UE, including a processor and a network interface, where the network interface is configured to send a service establishment message to an MME; and the processor is configured to send the service establishment message to the MME by using the network interface, where the service establishment message includes data service switch status indication information, the data service switch status indication information is used to indicate a status of a data service switch of the UE to a PGW, and the status of the data service switch includes that the data service switch is turned on or that the data service switch is turned off.

With reference to the twelfth aspect, in a first implementation of the twelfth aspect, the processor is further configured to determine whether the status of the data service switch of the UE changes; and that the processor sends the service establishment message to the MME by using the network interface is in some embodiments:

when the processor determines that the status of the data service switch changes, the processor sends, by using the network interface, the service establishment message including the data service switch status indication information to the MME.

With reference to the twelfth aspect or the first implementation of the twelfth aspect, in a second implementation of the twelfth aspect, the service establishment message includes a protocol configuration option PCO, where the PCO includes the data service switch status indication information.

With reference to the twelfth aspect, or the first or the second implementation of the twelfth aspect, in a third implementation of the twelfth aspect, the service establishment message includes one or more of an attach request message, a bearer resource change message, and a PDN connection establishment request message.

A thirteenth aspect discloses a data service control method, including:

after a packet data network gateway PGW receives a first data packet that comes from or goes to user equipment UE, forwarding, by the PGW, the first data packet;

determining, by the PGW, whether the first data packet belongs to a specified type; and if the first data packet belongs to the specified type, adding, by the PGW, fourth indication information to a charging data record CDR generated according to the first data packet, where the fourth indication information is used to instruct a charging system not to charge for the first data packet.

With reference to the thirteenth aspect, in a first implementation of the thirteenth aspect, the determining, by the PGW, whether the first data packet belongs to a specified type includes:

determining, by the PGW, whether the first data packet includes one or more of the following data packets:

an uplink data packet that is sent by the UE to a packet data network PDN network corresponding to an IMS access point name APN or a downlink data packet that is sent by a PDN network corresponding to an IMS APN to the UE;

a data packet coming from an address of a specified service server and going to the UE;

a data packet used to manage an IP address; and a data packet of a specified service type.

With reference to the first implementation of the thirteenth aspect, in a second implementation of the thirteenth aspect, the determining, by the PGW, whether the first data packet is a data packet of a specified service type includes:

performing, by the PGW, deep packet inspection DPI on the first data packet, and determining whether the first data packet is the data packet of the specified service type; or determining, by the PGW based on service type indication information included in the first data packet, whether the first data packet is the data packet of the specified service type.

With reference to the thirteenth aspect, or the first or the second implementation of the thirteenth aspect, in a third implementation of the thirteenth aspect, before the forwarding, by the PGW, the first data packet, the method further includes:

determining, by the PGW, that a status of a data service switch of the user equipment UE is that the data service switch is turned off.

With reference to the third implementation of the thirteenth aspect, in a fourth implementation of the thirteenth aspect, after the determining, by the PGW, that a status of a data service switch of the user equipment UE is that the data service switch is turned off, the method further includes:

adding, by the PGW, first indication information to the charging data record CDR generated according to the first data packet, where the first indication information is used to notify the charging system that the data service switch of the UE is turned off.

A fourteenth aspect discloses a PGW, including a processor and a network interface, where the network interface is configured to receive a first data packet that comes from or goes to user equipment UE;

the processor is configured to forward the first data packet;

the processor is further configured to determine whether the first data packet belongs to a specified type; and the processor is further configured to: when the first data packet belongs to the specified type, add fourth indication information to a charging data record CDR generated according to the first data packet, where the fourth indication information is used to instruct a charging system not to charge for the first data packet.

With reference to the fourteenth aspect, in a first implementation of the fourteenth aspect, before the processor forwards the first data packet, the processor is further configured to determine whether the first data packet includes one or more of the following data packets:

an uplink data packet that is sent by the UE to a packet data network PDN network corresponding to an IMS access point name APN or a downlink data packet that is sent by a PDN network corresponding to an IMS APN to the UE;

a data packet coming from an address of a specified service server and going to the UE;

a data packet used to manage an IP address; and a data packet of a specified service type.

With reference to the fourteenth aspect or the first implementation of the fourteenth aspect, in a second implementation of the fourteenth aspect, a manner used by the processor to determine whether the first data packet is the data packet of the specified service type is in some embodiments:

performing, by the processor, deep packet inspection DPI on the first data packet, and determining whether the first data packet is the data packet of the specified service type; or determining, by the processor based on service type indication information included in the first data packet, whether the first data packet is the data packet of the specified service type.

With reference to the fourteenth aspect, or the first or the second implementation of the fourteenth aspect, in a third implementation of the fourteenth aspect, the processor is further configured to: before forwarding the first data packet, determine that a status of a data service switch of the user equipment UE is that the data service switch is turned off.

With reference to the third implementation of the fourteenth aspect, in a fourth implementation of the fourteenth aspect, the processor is further configured to: after determining that the status of the data service switch of the user equipment UE is that the data service switch is turned off, add first indication information to a charging data record CDR generated according to the first data packet, where the first indication information is used to notify the charging system that the data service switch of the UE is turned off.

BRIEF DESCRIPTION OF DRAWINGS

To describe the technical solutions in the embodiments of this application more clearly, the following briefly describes the accompanying drawings required for the embodiments. Apparently, the accompanying drawings in the following description show merely some embodiments of this application, and persons of ordinary skill in the art may still derive other drawings from these accompanying drawings without creative efforts.

DESCRIPTION OF EMBODIMENTS

Figure 1:
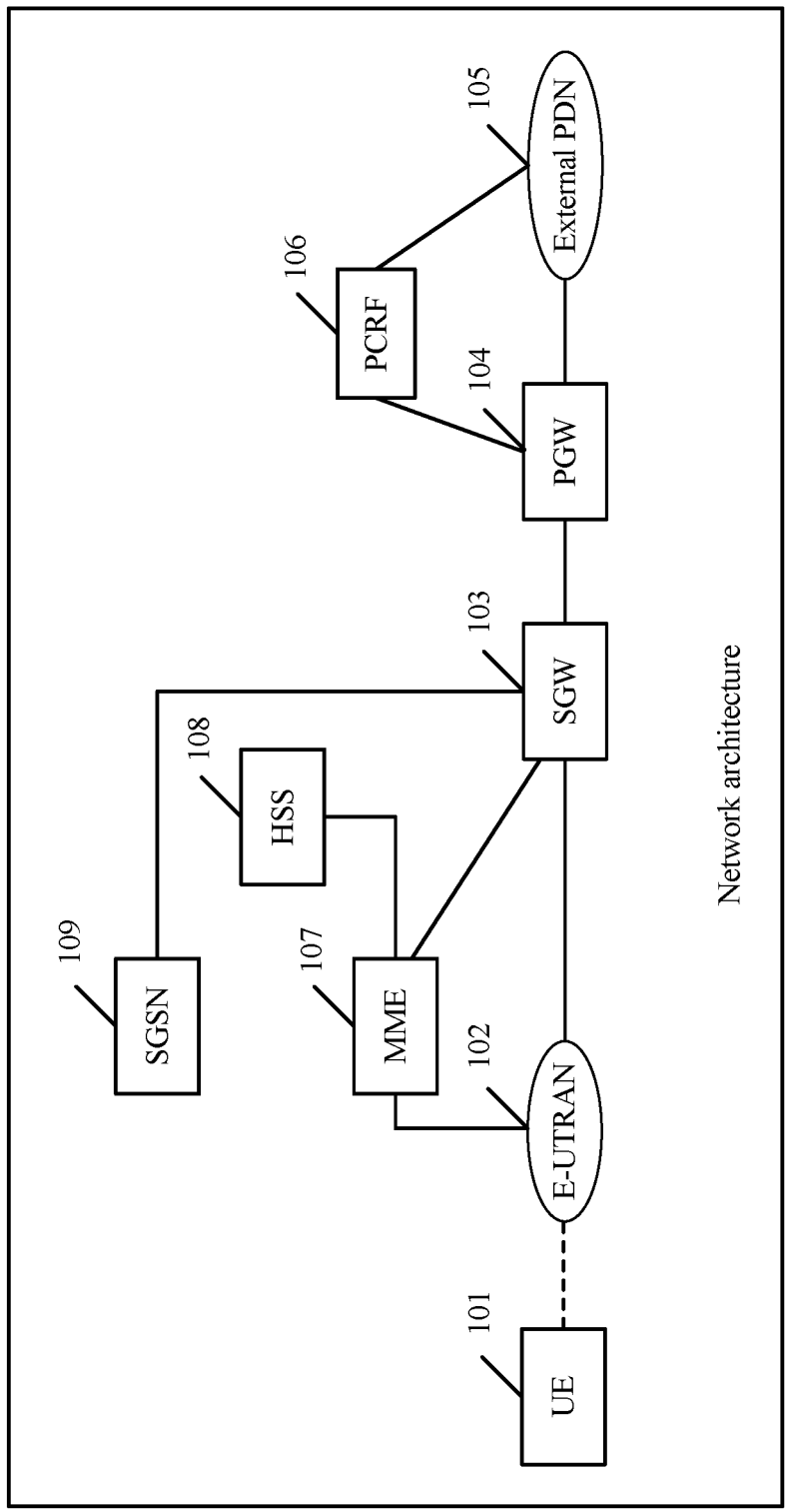
FIG. 1 is a schematic diagram of a network architecture according to an embodiment of this application.

To better understand embodiments of this application, a network architecture disclosed in an embodiment of this application is first described below. Referring to FIG. 1, FIG. 1 is a schematic diagram of the network architecture according to the embodiment of this application. As shown in FIG. 1, the network architecture includes user equipment (UE for short) 101, an evolved universal terrestrial radio access network (E-UTRAN for short) 102, a serving gateway (SGW for short) 103, a packet data network gateway (PGW for short) 104, an external packet data network (PDN for short) 105, a policy and charging rules function (PCRF for short) 106, a mobility management entity (MME for short) 107, home subscriber server (HSS for short) 108, and a serving GPRS support node (SGSN for short) 109. In an LTE data service, data packets of various data services are all transmitted on an uplink or downlink data transmission channel established between the user equipment 101, the evolved universal terrestrial radio access network 102, the serving gateway 103, the packet data network gateway 104, and the external packet data network 105.

Figure 2A:
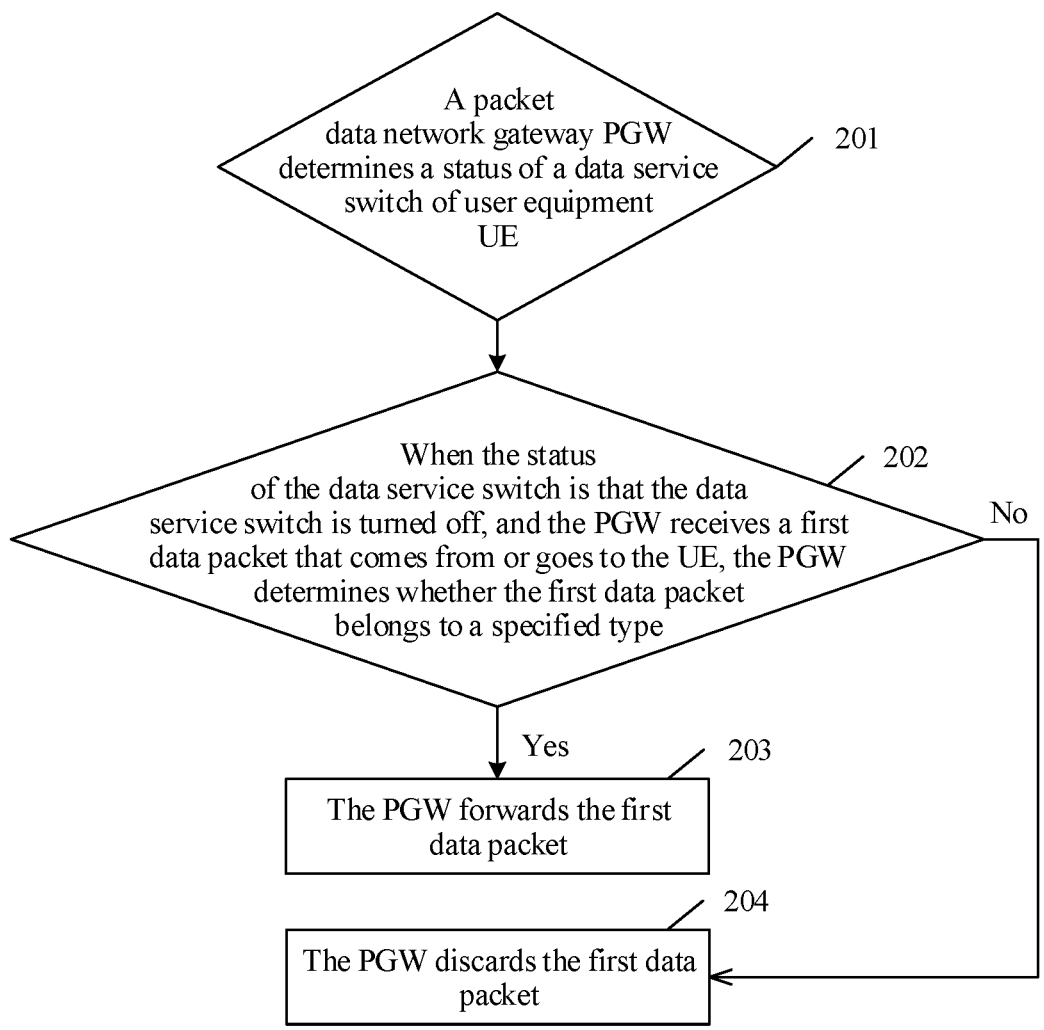
FIG. 2a is a schematic flowchart of a data service control method according to an embodiment of this application.

Referring to FIG. 2a, FIG. 2a is a schematic flowchart of a data service control method according to an embodiment of this application. As shown in FIG. 2a, the method includes the following steps.

201: A packet data network gateway PGW determines a status of a data service switch of user equipment UE, where the status of the data service switch includes that the data service switch is turned on or that the data service switch is turned off.

In this embodiment of this application, the UE is user equipment that has been registered with a Long Term Evolution LTE network. That a packet data network gateway determines a status of a data service of user equipment may be: receiving, by the PGW, indication information that indicates the status of the data service switch of the UE and that is sent by the UE, and obtaining the status of the data service switch of the UE from the indication information. In a specific scenario, for example, when UE receives a user operation of disabling a data service (for example, when a user turns off a data service switch of the UE), the UE sends, to an mobility management entity (MME), indication information indicating a status of the data service switch of the UE. The MME forwards the indication information to a serving gateway. The SGW forwards the indication information to a PGW. The PGW obtains the status of the data service switch of the UE from the indication information. The status of the data service switch includes that the data service switch is turned on or that the data service switch is turned off. The data service switch is also referred to as a data switch.

In some embodiments, step 201 may include:

receiving, by the PGW, a protocol configuration option (PCO) sent by the UE by using the MME, where the PCO includes data service switch status indication information, and the data service switch status indication information is used to indicate the status of the data service switch of the UE.

In this embodiment of this application, the UE may send a service establishment message (the service establishment message may be an attach request message, a bearer resource change message, a PDN connection establishment request message, or the like) to the MME. The service establishment message includes the data service switch status indication information, and the data service switch status indication information is used to indicate the status of the data service switch of the UE. In some embodiments, the UE may add the data service switch status indication information to the protocol configuration option (PCO for short) sent to the MME, and the data service switch status indication information is used to indicate the status of the data service switch of the UE. The MME transparently transmits (transparent transmission means that the PCO is not processed in a transmission process) the PCO to the SGW by using the service establishment message. The SGW then transparently transmits the PCO to the PGW by using the service establishment message. After obtaining the PCO, the PGW obtains the data service switch status indication information carried in the PCO. In this way, the PGW learns of the status of the data service switch of the UE. In some embodiments, the PCO may be encrypted, thereby improving security of the transparent transmission of the PCO. For example, the PCO may be encrypted by using identity information (such as a username or a password) of a user. The PGW determines the status of the data service switch of the UE based on the data service switch status indication information in the PCO sent by the UE, and when the data service switch of the UE changes, the PGW may be notified of the status of the data service switch of the UE in time.

202: When the status of the data service switch is that the data service switch is turned off, and the PGW receives a first data packet that comes from or goes to the UE, the PGW determines whether the first data packet belongs to a specified type; and if yes, perform step 203; or if no, perform step 204.

In some embodiments, after the PGW determines that a service registration status of the UE is an IMS registration state, when the status of the data service switch of the UE is that the data service switch is turned off, the PGW sends a first status notification message to an IP multimedia subsystem IMS network. The first status notification message is used to notify the IMS network that the status of the data service switch of the UE is that the data service switch is turned off.

In some embodiments, that the PGW sends a first status notification message to the IPIP multimedia subsystem IMS network may be in some embodiments:

the PGW first sends the first status notification message to a policy and charging rules function (PCRF for short), and the PCRF then forwards the first status notification message to the IPIP multimedia subsystem IMS network.

The PGW may notify the status of the data service switch of the UE to the IMS network, so that the IMS network determines, based on the status of the data service switch of the UE, whether to continue sending data to the UE.

203: The PGW forwards the first data packet.

204: The PGW discards the first data packet.

In this embodiment of this application, after the status of the data service switch of the UE is that the data service switch is turned off, and the PGW receives the first data packet that comes from or goes to the UE, the PGW forwards or discards the first data packet based on a type of the first data packet. In some embodiments, the PGW determines whether the first data packet belongs to the specified type. If the first data packet belongs to the specified type, the PGW forwards the first data packet; or if the first data packet does not belong to the specified type, the PGW discards the first data packet. The specified type may include an uplink data packet that is sent by the UE to a PDN network corresponding to an IMS APN or a downlink data packet that is sent by a PDN network corresponding to an IMS APN to the UE, a data packet coming from an address of a specified service server (for example, an address of a rich communication suite RCS server) and going to the UE, a data packet used to manage an IP address, a data packet of a specified service type (such as a voice over LTE VoLTE service or a rich communication suite RCS service), and the like. The specified type may be preset by the UE or a network-side device (such as a home subscriber server HSS, a proxy-call session control function P-CSCF, or an application function AF) and sent to the PGW, or may be preset and stored by the PGW based on the service registration status of the UE.

In some embodiments, the data packet of the specified type may be one or a combination of the following four:

(1) An uplink data packet that is sent by the UE to a packet data network PDN network corresponding to an IMS access point name APN or a downlink data packet that is sent by a PDN network corresponding to an IMS APN to the UE, in other words, an uplink or downlink data packet of an IMS service of the UE. To ensure that the IMS service can be normally performed, after the data service switch of the UE is turned off, the PGW continues forwarding the uplink or downlink data packet of the IMS service.

(2) A data packet coming from an address of a specified service server (for example, an address of a rich communication suite RCS server) and going to the UE. The address of the specified service server may be preset by the UE or the PGW and is stored in the PGW. The PGW determines whether a source address of the first data packet is the prestored address of the specified service server, and if yes, determines that the first data packet belongs to the specified type.

(3) A data packet used to manage an IP address.

The data packet used to manage an IP address is a data packet used to manage an IP address, allocate an IP address, and the like. For example, the data packet may be a Dynamic Host Configuration Protocol (DHCP for short) data packet used to automatically allocate an IP address.

In some embodiments, whether a data packet belongs to the data packet used to manage an IP address may be determined, based on information such as a port number and some specific fields, by parsing the data packet. Certainly, determining may be performed in another manner. This is not in some embodiments limited in this application. After the status of the data service switch of the UE is that the data service switch is turned off, it may be ensured that the data packet of the specified type can be continuously forwarded without affecting an important service.

For example, if the PGW receives a data packet 1 that goes to the UE, and obtains a port number UDP67/68 corresponding to the data packet 1 by parsing the data packet 1, the data packet 1 may be determined as a DHCP data packet.

When the status of the data service switch of the UE is that the data service switch is turned off, the PGW continues forwarding the data packet that comes from or goes to the UE and that is used to manage an IP address, thereby ensuring that an IP address management service is smoothly performed after the status of the data service switch of the UE is that the data service switch is turned off.

(4) A data packet of a specified service type, such as a voice over LTE VoLTE service or a rich communication suite RCS service. For example, the specified service type of the UE is stored in the HSS of the UE, and the PGW receives and stores the specified service type sent by the HSS of the UE. Alternatively, an operator directly configures the specified service type and stores the specified service type in the PGW. The PGW determines, based on the stored specified service type, whether the first data packet is the data packet of the specified service type. After the status of the data service switch of the UE is that the data service switch is turned off, it may be ensured that the data packet of the specified service type can be continuously forwarded.

In some embodiments, that the PGW determines whether the first data packet is the data packet of the specified service type may be in some embodiments:

(1) The PGW performs deep packet inspection DPI on the first data packet.

For the DPI, in addition to analyzing an IP 5-tuple (a source IP address, a source port, a destination IP address, a destination IP port, and a transport layer protocol) corresponding to the data packet, an application analysis, a user analysis, a network element analysis, traffic management and control, and the like may be further performed on the data packet. Whether the first data packet is the data packet of the specified service type may be determined by performing the deep packet inspection on the first data packet.

(2) The PGW determines, based on service type indication information included in the first data packet, whether the first data packet is the data packet of the specified service type.

For example, the RCS service server or the UE may set a DSCP field in an RCS service data packet to a special value, and after receiving the data packet, the PGW may determine, based on the DSCP being the specified special value, that the data packet is an RCS service data packet.

In some embodiments, step 202 may include:

when the PGW determines that a service registration status of the UE is IMS registration state, determining, by the PGW, whether the first data packet belongs to the specified type.

The PGW may determine the service registration status of the UE based on indication information that indicates the service registration status of the UE and that is sent by the UE by using the MME. For example, the UE may send a service establishment message (the service establishment message may be an attach request message, a bearer resource change message, a PDN connection establishment request message, or the like) to the MME. The service establishment message includes the service registration status indication information, and the service registration status indication information is used to indicate the service registration status of the UE. In some embodiments, the UE may add service registration status indication information to a PCO sent to the MME, and the service registration status indication information is used to indicate the service registration status of the UE. The MME transparently transmits the PCO to the SGW by using the service establishment message. The SGW then transparently transmits the PCO to the PGW by using the service establishment message. After obtaining the PCO, the PGW obtains the service registration status indication information carried in the PCO. In this way, the PGW learns of the service registration status of the UE. When the PGW determines that the service registration status of the UE is the IMS registration state, the PGW determines whether the first data packet belongs to the specified type. In this embodiment of this application, the data packet of the specified type is considered by default as a data packet that is based on an IMS service. The PGW forwards the data packet of the specified type only when the PGW determines that the service registration status of the UE is the IMS registration state. During implementation of this embodiment of this application, the PGW forwards the first data packet of the specified type only when the service registration status of the UE is the IMS registration state. In this way, after the data service switch of the UE is turned off, it may be ensured that the data packet of the IMS service can be normally sent.

In the embodiment shown in FIG. 2a, if the status of the data service switch of the UE is that the data service switch is turned off, after the PGW receives the first data packet that comes from or goes to the UE, the PGW determines whether the first data packet belongs to the specified type. The PGW determines, depending on whether the first data packet belongs to the specified type, whether to forward the first data packet. The data packet of the specified type is usually a relatively important data packet. After the data service switch of the UE is turned off, the PGW still forwards the data packet of the specified type, thereby avoiding that the UE cannot forward the data packet of the specified type after the data service switch is turned off. During implementation of the method shown in FIG. 2a, after the data service switch of the UE is turned off, it may be ensured that the data packet of the specified type of the UE can still be normally sent without being affected by the data service switch.

Figure 2B:
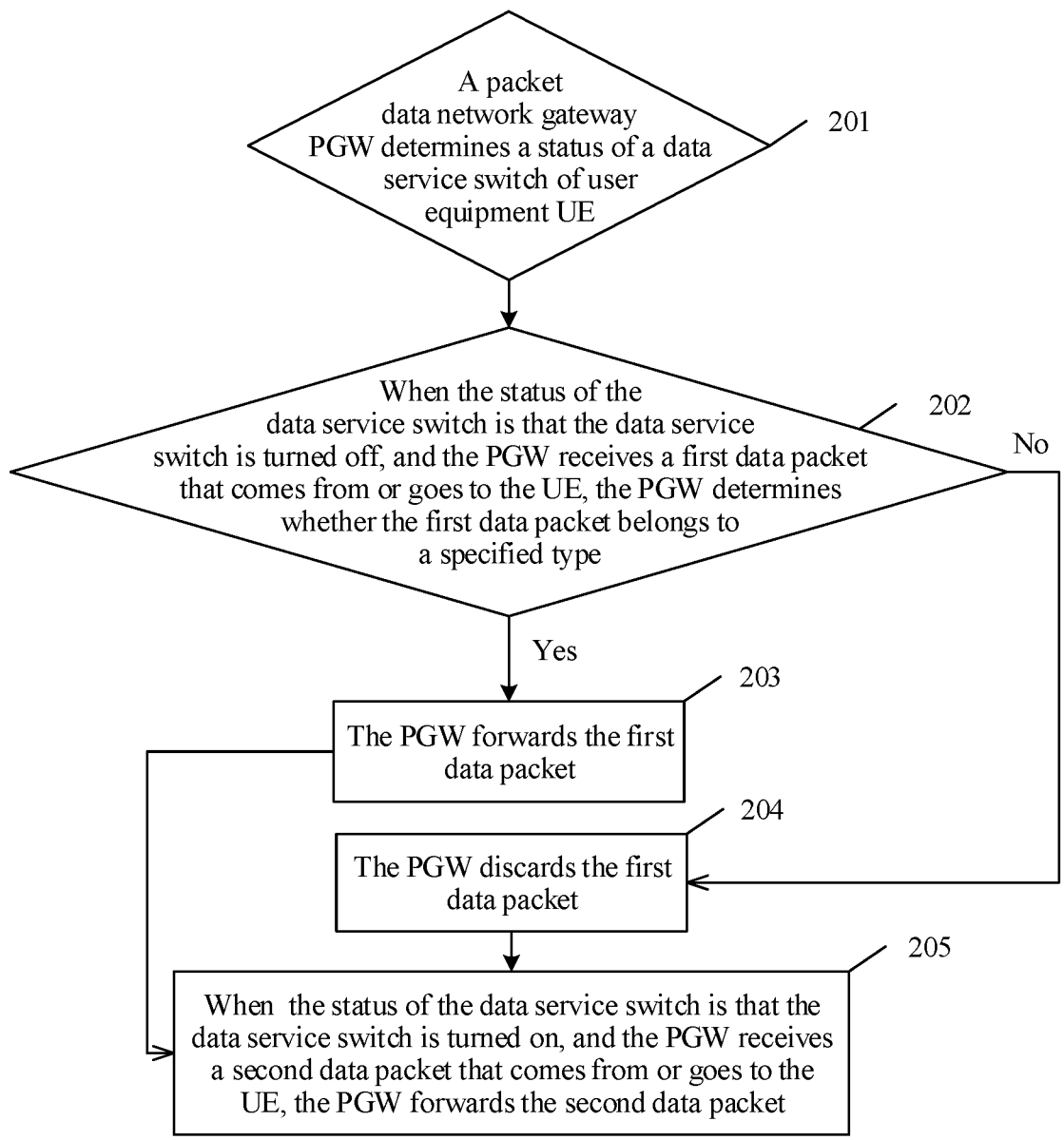
FIG. 2b is a schematic flowchart of another data service control method according to an embodiment of this application.

Also referring to FIG. 2b, FIG. 2b is a schematic flowchart of another data service control method according to an embodiment of this application. FIG. 2b optimizes FIG. 2a. In FIG. 2b, after step 203 or step 204 is performed, the following step is further performed.

205: When the status of the data service switch is that the data service switch is turned on, and the PGW receives a second data packet that comes from or goes to the UE, the PGW forwards the second data packet.

Further, when the status of the data service switch of the UE is that the data service switch is turned on, the PGW sends a second status notification message to the IP multimedia subsystem IMS network. The second status notification message is used to notify the IMS network that the status of the data service switch of the UE is that the data service switch is turned on.

In some embodiments, that the PGW sends a second status notification message to the IP multimedia subsystem IMS network may be in some embodiments:

The PGW first sends the second status notification message to the policy and charging rules function (PCRF for short), and the PCRF then forwards the second status notification message to the IP multimedia subsystem IMS network.

The PGW may notify the status of the data service switch of the UE to the IMS network, so that the IMS network determines, based on the status of the data service switch of the UE, whether to continue sending data to the UE.

In some embodiments, after step 205 is performed, the following step may be further performed:

notifying, by the PGW, a charging system that the status of the data service switch of the UE is that the data service switch is turned on.

In some embodiments, a manner used by the PGW to notify the charging system that the status of the data service switch of the UE is that the data service switch is turned on may be in some embodiments:

adding, by the PGW, second indication information to a charging data record CDR generated according to the second data packet, where the second indication information is used to notify the charging system that the data service switch of the UE is turned on; or notifying, by the PGW in a second credit control request CCR (CCR for short) message, the charging system that the data service switch of the UE is turned on.

In this embodiment of this application, after step 203 or step 204 is performed, step 205 is performed. When the status of the data service switch is that the data service switch is turned on, and the PGW receives the second data packet that comes from or goes to the UE, the PGW forwards the second data packet.

During implementation of the method shown in FIG. 2b, after the status of the data service switch of the UE is switched from being turned off to being turned on, and the PGW receives the second data packet that comes from or goes to the UE, the PGW may directly forward the second data packet that comes from or goes to the UE. After the data service switch of the UE is turned on, the PGW may charge, according to a normal charging standard, for traffic generated according to the second data packet that comes from or goes to the UE. After the status of the data service switch of the UE is switched from being turned off to being turned on, the PGW may resume an original charging operation.

Figure 2C:
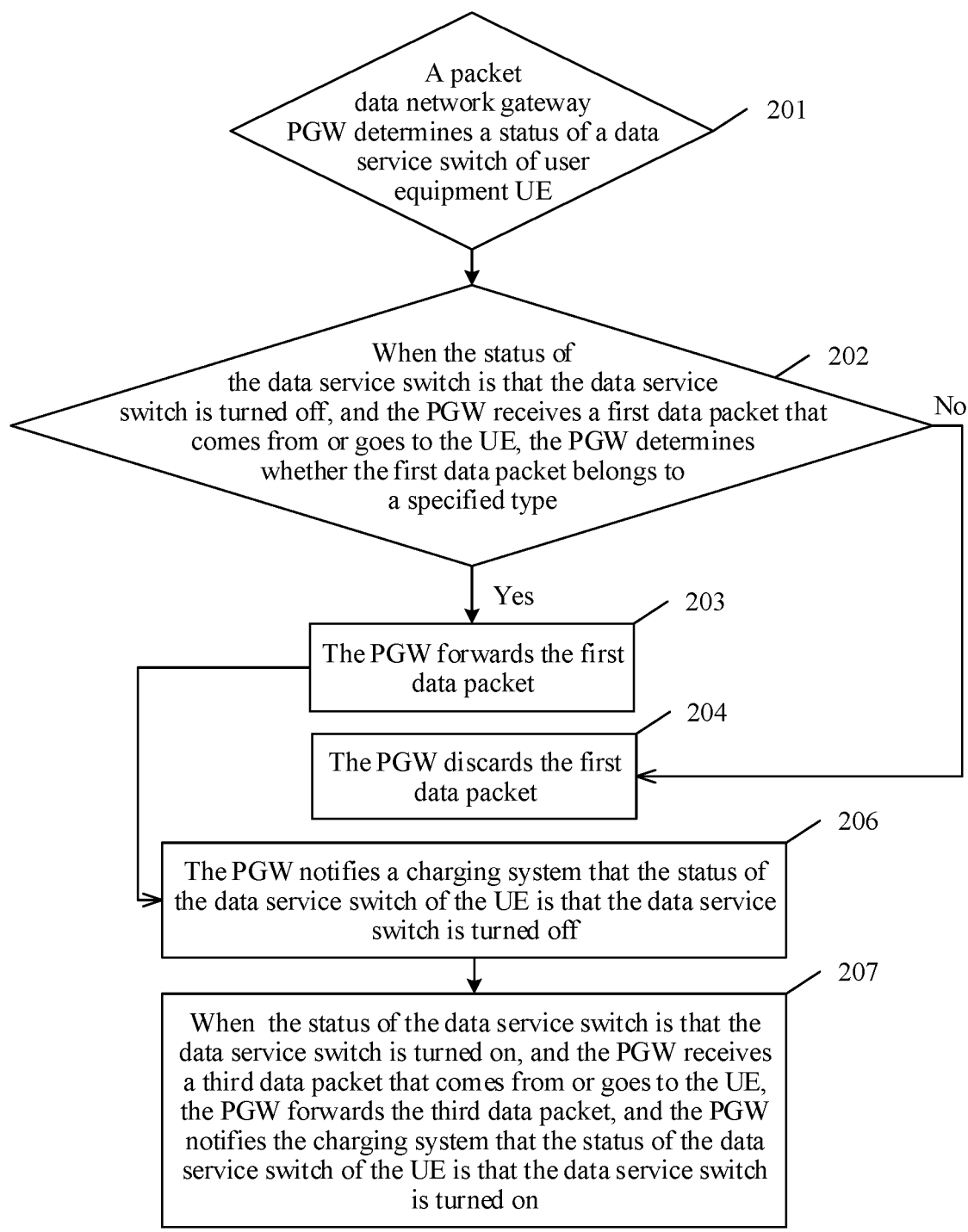
FIG. 2c is a schematic flowchart of another data service control method according to an embodiment of this application.

Also referring to FIG. 2c, FIG. 2c is a schematic flowchart of another data service control method according to an embodiment of this application. FIG. 2c optimizes FIG. 2a. In FIG. 2c, after step 203 is performed, the following steps are further performed.

206: The PGW notifies a charging system that the status of the data service switch of the UE is that the data service switch is turned off.

Step 206 may in some embodiments include:

adding, by the PGW, first indication information to a charging data record CDR generated according to the first data packet, where the first indication information is used to notify the charging system that the data service switch of the UE is turned off; or notifying, by the PGW in a first credit control request CCR message, the charging system that the data service switch of the UE is turned off.

In this embodiment of this application, if the status of the data service switch of the UE is that the data service switch is turned off, after the PGW receives the first data packet that comes from or goes to the UE, the PGW determines whether the first data packet belongs to the specified type. The PGW forwards the first data packet if yes. After the PGW forwards the first data packet, the PGW adds the first indication information to the CDR generated according to the first data packet. The first indication information is used to notify the charging system that the data service switch of the UE is turned off. In this embodiment of this application, the PGW notifies the charging system that the data service switch of the UE is turned off, so that the charging system charges for the first data packet according to a charging standard used after the data service switch of the UE is turned off. The charging system may determine whether to charge for the first data packet.

207: When the status of the data service switch is that the data service switch is turned on, and the PGW receives a third data packet that comes from or goes to the UE, the PGW forwards the third data packet, and the PGW notifies the charging system that the status of the data service switch of the UE is that the data service switch is turned on.

In some embodiments, a manner used by the PGW to notify the charging system that the status of the data service switch of the UE is that the data service switch is turned on is in some embodiments:

adding, by the PGW, third indication information to a CDR generated according to the third data packet, where the third indication information is used to notify the charging system that the data service switch of the UE is turned on; or notifying, by the PGW in a second credit control request CCR (CCR for short) message, the charging system that the data service switch of the UE is turned on.

In this embodiment of this application, after step 206 is performed, step 207 may be performed. After the status of the data service switch of the UE is switched from being turned off to being turned on, and the PGW receives a third data packet that comes from or goes to the UE, the PGW may forward the third data packet, and add the third indication information to the CDR generated according to the third data packet. The third indication information is used to notify the charging system that the data service switch of the UE is turned on.

Further, when the status of the data service switch of the UE is that the data service switch is turned on, the PGW sends a second status notification message to the IP multimedia subsystem IMS network. The second status notification message is used to notify the IMS network that the status of the data service switch of the UE is that the data service switch is turned on.

In some embodiments, that the PGW sends a second status notification message to the IP multimedia subsystem IMS network may be in some embodiments:

the PGW first sends the second status notification message to the policy and charging rules function (PCRF for short), and the PCRF then forwards the second status notification message to the IP multimedia subsystem IMS network.

The PGW may notify the status of the data service switch of the UE to the IMS network, so that the IMS network determines, based on the status of the data service switch of the UE, whether to continue sending data to the UE.

In some embodiments, after the status of the data service switch of the UE is that the data service switch is turned on, the PGW notifies the charging system that the status of the data service switch of the UE is that the data service switch is turned on.

In some embodiments, a manner used by the PGW to notify the charging system that the status of the data service switch of the UE is that the data service switch is turned on may be in some embodiments:

adding, by the PGW, second indication information to a charging data record CDR generated according to the second data packet, where the second indication information is used to notify the charging system that the data service switch of the UE is turned on; or notifying, by the PGW in a second credit control request CCR (CCR for short) message, the charging system that the data service switch of the UE is turned on.

During implementation of the method shown in FIG. 2c, after the status of the data service switch of the UE is switched from being turned off to being turned on, the charging system may be notified that the data service switch of the UE is turned on, so that the charging system charges for the third data packet according to a charging standard used after the data service switch of the UE is turned on.

Figure 3:
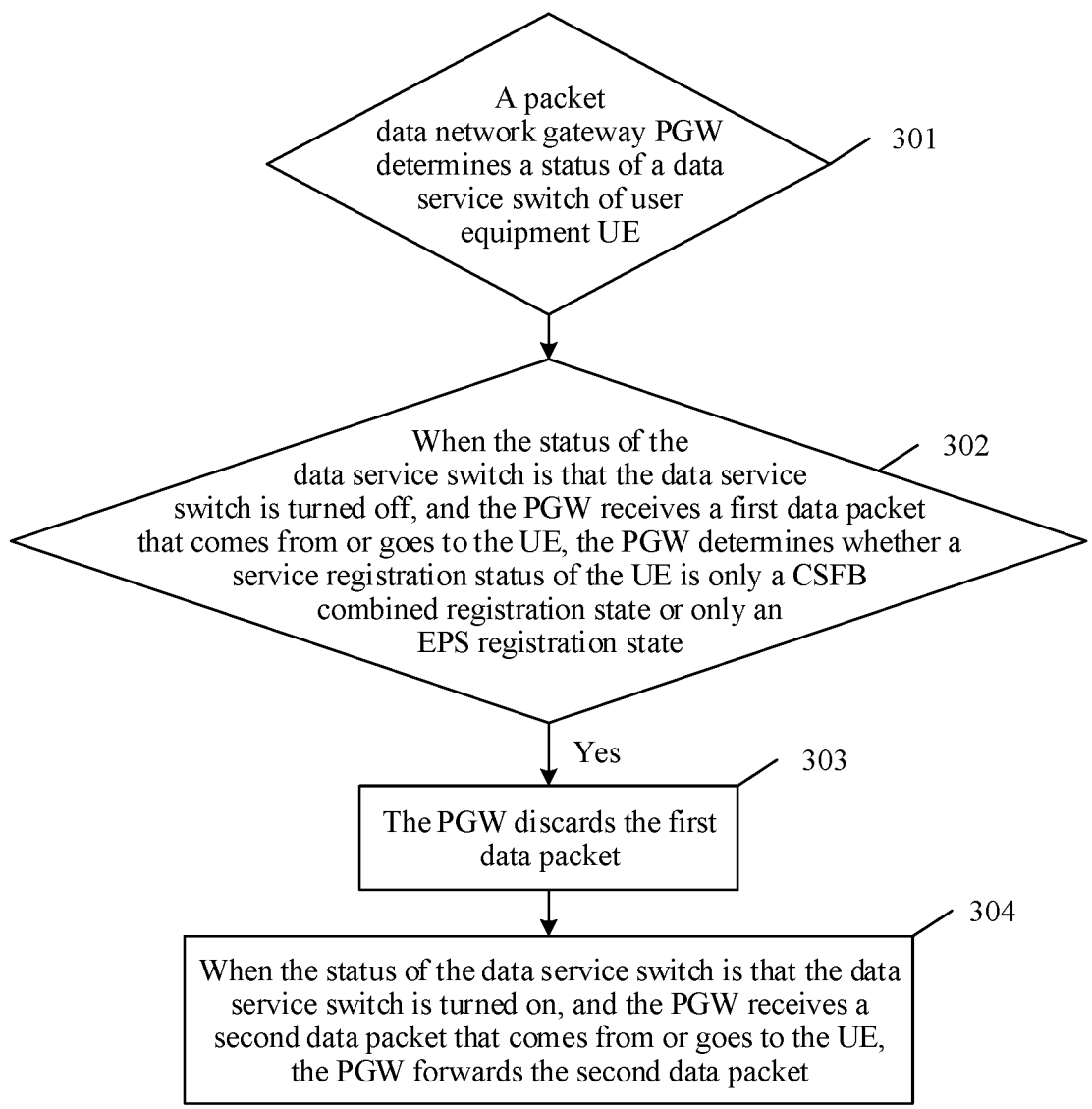
FIG. 3 is a schematic flowchart of another data service control method according to an embodiment of this application.

Referring to FIG. 3, FIG. 3 is a schematic flowchart of another data service control method according to an embodiment of this application. As shown in FIG. 3, the method includes the following steps.

301: A packet data network gateway PGW determines a status of a data service switch of user equipment UE, where the status of the data service switch includes that the data service switch is turned on or that the data service switch is turned off.

For step 301 in this embodiment of this application, refer to step 201 in FIG. 2*a*. Details are not described again in this embodiment of this application.

302: When the status of the data service switch is that the data service switch is turned off, and the PGW receives a first data packet that comes from or goes to the UE, the PGW determines whether a service registration status of the UE is only a circuit switched fallback CSFB combined registration state or only an evolved packet system EPS registration state; and if yes, perform step 303, where only the CSFB combined registration state includes a state that the UE is registered with both a circuit switched CS network and an EPS network, but is not registered with an IP multimedia subsystem IMS network.

In this embodiment of this application, if the status of the data service switch of the UE is that the data service switch is turned off, after the PGW receives the first data packet that comes from or goes to the UE, the PGW forwards or discards the first data packet based on the service registration status of the first data packet. In some embodiments, if the status of the data service switch of the UE is that the data service switch is turned off, after the PGW receives the first data packet that comes from or goes to the UE, the PGW determines whether the service registration status of the UE is only the circuit switched fallback CSFB combined registration state or only the evolved packet system EPS registration state. If yes, the PGW discards the first data packet. Only the CSFB combined registration state includes a state that in a registration process, the UE is registered with both the CS network and the EPS network, but is not registered with the IMS network. When the UE is in only the CSFB combined registration state, the UE may use a 4G data service and a 2G/3G voice service, and when the data service switch of the UE is turned off, the UE cannot use the 4G data service, but may still use a CSFB voice service. When the UE is in only the EPS registration state, the UE may use only the 4G data service, and when the data service switch of the UE is turned off, the UE cannot use the 4G data service.

In some embodiments, step 302 may include: when the PGW determines that the first data packet is not a data packet used to manage an IP address, determining, by the PGW, whether the service registration status of the UE is only the CSFB combined registration state or only the EPS registration state.

In this embodiment of this application, the data packet used to manage an IP address is an important data packet of the UE, and should not be easily discarded. When the PGW determines that the first data packet is not the data packet used to manage an IP address, and the PGW determines that the service registration status of the UE is only the CSFB combined registration state or only the EPS registration state, the PGW discards the first data packet. When preparing to discard a data packet, the PGW first determines whether the data packet is the data packet used to manage an IP address. If no, the PGW discards the data packet. In this way, it may be ensured that an important data packet can be normally received and sent after the data service switch of the UE is turned off.

In some embodiments, step 302 may include: receiving, by the PGW, a PCO sent by the UE by using an MME, where the PCO includes service registration status indication information; and determining, by the PGW, whether the service registration status indication information indicates that the UE is in only the CSFB combined registration state or in only the EPS registration state.

In this embodiment of this application, the PGW determines, based on the service registration status indication information in the PCO sent by the UE, whether the UE is in only the CSFB combined registration state or in only the EPS registration state. When the UE is in only the CSFB combined registration state or in only the EPS registration state, the PGW may be notified of the service registration status of the UE in time by using the PCO. The UE may send a service establishment message (the service establishment message may be an attach request message, a bearer resource change message, a PDN connection establishment request message, or the like) to the MME. The service establishment message includes the service registration status indication information, and the service registration status indication information is used to indicate the service registration status of the UE. In some embodiments, the UE may add the service registration status indication information to the PCO sent to the MME, and the service registration status indication information is used to indicate the service registration status of the UE. The MME transparently transmits the PCO to an SGW by using the service establishment message. The SGW then transparently transmits the PCO to the PGW by using the service establishment message. After obtaining the PCO, the PGW obtains the service registration status indication information carried in the PCO. The PGW determines whether the service registration status indication information indicates that the UE is in only the CSFB combined registration state or in only the EPS registration state. If yes, step 303 is performed.

303: The PGW discards the first data packet.

During implementation of the method shown in FIG. 3, when the data service switch of the UE is turned off, when the PGW determines that the service registration status of the UE is only the CSFB combined registration state or only the EPS registration state, the first data packet that is received by the PGW and that comes from or goes to the UE is a data packet of a 3G or 4G data service. To save traffic of the UE, the PGW directly discards the first data packet.

304: When the status of the data service switch is that the data service switch is turned on, and the PGW receives a second data packet that comes from or goes to the UE, the PGW forwards the second data packet.

In this embodiment of this application, after step 303 is performed, step 304 may be performed. When the status of the data service switch is that the data service switch is turned on, and the PGW receives the second data packet that comes from or goes to the UE, the PGW forwards the second data packet. After the data service switch of the UE is turned on, the PGW may charge, according to a normal charging standard, for the second data packet that comes from or goes to the UE. After the status of the data service switch of the UE is switched from being turned off to being turned on, the PGW resumes an original forwarding operation.

Figure 4:
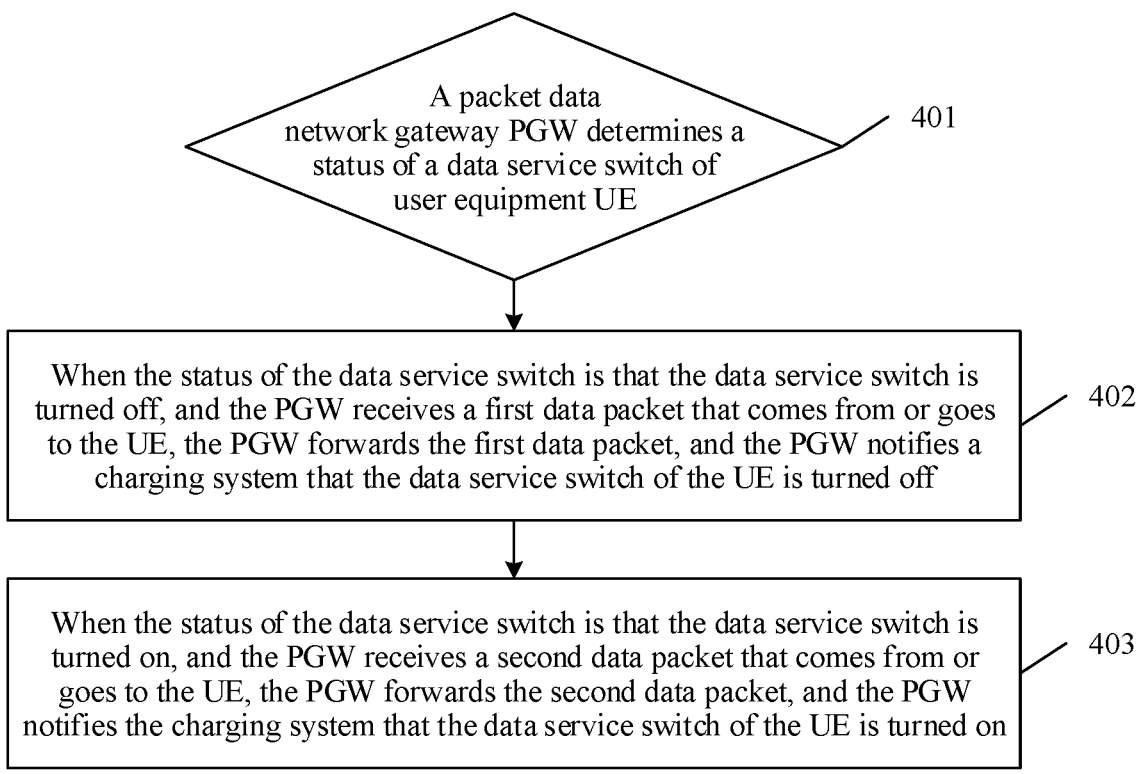
FIG. 4 is a schematic flowchart of another data service control method according to an embodiment of this application.

Referring to FIG. 4, FIG. 4 is a schematic flowchart of another data service control method according to an embodiment of this application. As shown in FIG. 4, the method includes the following steps.

401: A packet data network gateway PGW determines a status of a data service switch of user equipment UE, where the status of the data service switch includes that the data service switch is turned on or that the data service switch is turned off.

For step 401 in this embodiment of this application, refer to step 201 in FIG. 2*a*. Details are not described again in this embodiment of this application.

402: When the status of the data service switch is that the data service switch is turned off, and the PGW receives a first data packet that comes from or goes to the UE, the PGW forwards the first data packet, and the PGW notifies a charging system that the data service switch of the UE is turned off. In some embodiments, a manner used by the PGW to notify the charging system that the data service switch of the UE is turned off is in some embodiments:

adding, by the PGW, first indication information to a charging data record CDR generated according to the first data packet, where the first indication information is used to notify the charging system that the data service switch of the UE is turned off; or notifying, by the PGW in a first credit control request (CCR for short) message, the charging system that the data service switch of the UE is turned off.

In this embodiment of this application, if the status of the data service switch of the UE is that the data service switch is turned off, after the PGW receives the first data packet that comes from or goes to the UE, the PGW directly forwards the first data packet, and the PGW adds the first indication information to the charging data record CDR generated according to the first data packet. The first indication information is used to notify the charging system that the data service switch of the UE is turned off. In this embodiment of this application, if the status of the data service switch of the UE is that the data service switch is turned off, after the PGW receives the first data packet that comes from or goes to the UE, the PGW does not charge for the first data packet, but notifies the charging system that the data service switch of the UE is turned off, so that the charging system charges for the first data packet according to a charging standard used after the data service switch of the UE is turned off, and the charging system determines whether to charge for the first data packet.

403: When the status of the data service switch is that the data service switch is turned on, and the PGW receives a second data packet that comes from or goes to the UE, the PGW forwards the second data packet, and the PGW notifies the charging system that the data service switch of the UE is turned on. In some embodiments, a manner used by the PGW to notify the charging system that the data service switch of the UE is turned on is in some embodiments:

adding, by the PGW, second indication information to a CDR generated according to the second data packet, where the second indication information is used to notify the charging system that the data service switch of the UE is turned on; or notifying, by the PGW in a second credit control request (CCR for short) message, the charging system that the data service switch of the UE is turned on.

In this embodiment of this application, after step 402 is performed, step 403 may be performed. After the status of the data service switch of the UE is switched from being turned off to being turned on, and the PGW receives the second data packet that comes from or goes to the UE, the PGW may forward the second data packet, and add the second indication information to the CDR generated according to the second data packet. The second indication information is used to notify the charging system that the data service switch of the UE is turned on. During implementation of this embodiment of this application, after the status of the data service switch of the UE is switched from being turned off to being turned on, the charging system may be notified that the data service switch of the UE is turned on, so that the charging system charges for the second data packet according to a charging standard used after the data service switch of the UE is turned on.

During implementation of the method shown in FIG. 4, after the data service switch of the UE is turned off, after receiving the first data packet that comes from or goes to the UE, the PGW directly forwards the first data packet, and the PGW does not charge for the first data packet, but notifies the charging system that the data service switch of the UE is turned off, so that the charging system charges for the first data packet according to the charging standard used after the data service switch of the UE is turned off. After the status of the data service switch of the UE is switched from being turned off to being turned on, the charging system is notified that the data service switch of the UE is turned on, so that the charging system charges for the second data packet according to the charging standard used after the data service switch of the UE is turned on.

Figure 4A:
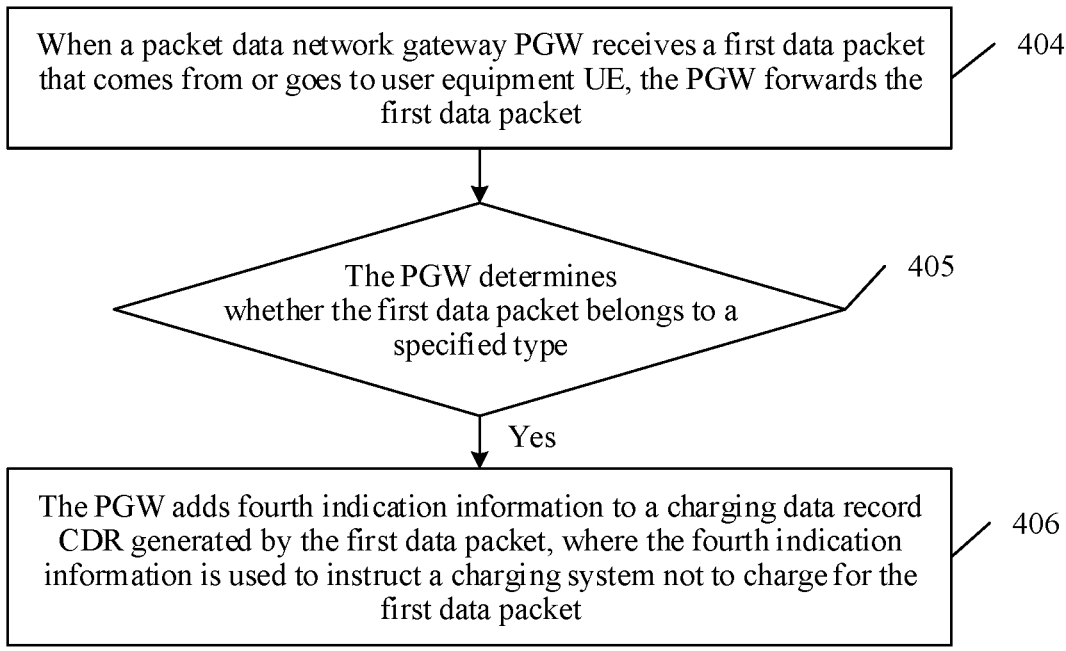
FIG. 4a is a schematic flowchart of another data service control method according to an embodiment of this application.

Referring to FIG. 4*a*, FIG. 4*a* is a schematic flowchart of another data service control method according to an embodiment of this application. As shown in FIG. 4*a*, the method includes the following steps.

404: When a packet data network gateway PGW receives a first data packet that comes from or goes to user equipment UE, the PGW forwards the first data packet.

405: The PGW determines whether the first data packet belongs to a specified type; and if yes, perform step 406.

The specified type may include an uplink data packet that is sent by the UE to a PDN network corresponding to an IMS APN or a downlink data packet that is sent by a PDN network corresponding to an IMS APN to the UE, a data packet coming from an address of a specified service server (for example, an address of a rich communication suite RCS server) and going to the UE, a data packet used to manage an IP address, a data packet of a specified service type (such as a voice over LTE VoLTE service or a rich communication suite RCS service), and the like. The specified type may be preset by the UE or a network-side device (such as a home subscriber server HSS, a proxy-call session control function P-CSCF, or an application function AF) and sent to the PGW, or may be preset and stored by the PGW based on a service registration status of the UE.

In some embodiments, the data packet of the specified type may be one or a combination of the following four:

(1) An uplink data packet that is sent by the UE to a packet data network PDN network corresponding to an IMS access point name APN or a downlink data packet that is sent by a PDN network corresponding to an IMS APN to the UE, in other words, an uplink or downlink data packet of an IMS service of the UE. To ensure that the IMS service can be normally performed, after a data service switch of the UE is turned off, the PGW continues forwarding the uplink or downlink data packet of the IMS service.

(2) A data packet coming from an address of a specified service server (for example, an address of a rich communication suite RCS server) and going to the UE. The address of the specified service server may be preset by the UE or the PGW and is stored in the PGW. The PGW determines whether a source address of the first data packet is the prestored address of the specified service server, and if yes, determines that the first data packet belongs to the specified type.

(3) A data packet used to manage an IP address.

The data packet used to manage an IP address is a data packet used to manage an IP address, allocate an IP address, and the like. For example, the data packet may be a Dynamic Host Configuration Protocol (DHCP for short) data packet used to automatically allocate an IP address. For another example, a user may manage allocation of an IPv6 address, a router solicitation (RS for short), and a router advertisement (RA for short).

In some embodiments, whether a data packet belongs to the data packet used to manage an IP address may be determined, based on information such as a port number and some specific fields, by parsing the data packet. Certainly, determining may be performed in another manner. This is not in some embodiments limited in this application. After a status of the data service switch of the UE is that the data service switch is turned off, it may be ensured that the data packet of the specified type can be continuously forwarded without affecting an important service.

For example, if the PGW receives a data packet 1 that goes to the UE, and obtains a port number UDP67/68 corresponding to the data packet 1 by parsing the data packet 1, the data packet 1 may be determined as a DHCP data packet.

After the status of the data service switch of the UE is that the data service switch is turned off, the PGW continues forwarding the data packet that comes from or goes to the UE and that is used to manage an IP address, thereby ensuring that an IP address management service is smoothly performed after the status of the data service switch of the UE is that the data service switch is turned off.

(4) A data packet of a specified service type, such as a voice over LTE VoLTE service or a rich communication suite RCS service. For example, the specified service type of the UE is stored in the HSS of the UE, and the PGW receives and stores the specified service type sent by the HSS of the UE. Alternatively, an operator directly configures the specified service type and stores the specified service type in the PGW. The PGW determines, based on the stored specified service type, whether the first data packet is the data packet of the specified service type. After the status of the data service switch of the UE is that the data service switch is turned off, it may be ensured that the data packet of the specified service type can be continuously forwarded.

In some embodiments, that the PGW determines whether the first data packet is the data packet of the specified service type may be in some embodiments:

(1) The PGW performs deep packet inspection DPI on the first data packet.

For the DPI, in addition to analyzing an IP 5-tuple (a source IP address, a source port, a destination IP address, a destination IP port, and a transport layer protocol) corresponding to the data packet, an application analysis, a user analysis, a network element analysis, traffic management and control, and the like may be further performed on the data packet. Whether the first data packet is the data packet of the specified service type may be determined by performing the deep packet inspection on the first data packet.

(2) The PGW determines, based on service type indication information included in the first data packet, whether the first data packet is the data packet of the specified service type.

For example, the RCS service server or the UE may set a DSCP field in an RCS service data packet to a special value, and after receiving the data packet, the PGW may determine, based on the DSCP being the specified special value, that the data packet is an RCS service data packet.

406: The PGW adds fourth indication information to a charging data record CDR generated according to the first data packet, where the fourth indication information is used to instruct a charging system not to charge for the first data packet.

In some embodiments, before step 404 is performed, the following step may be further performed:

determining, by the PGW, that the status of the data service switch of the user equipment UE is that the data service switch is turned off.

When the PGW determines that the status of the data service switch of the user equipment UE is that the data service switch is turned off, the PGW forwards the first data packet. When the status of the data service switch of the UE is that the data service switch is turned off, the data packet may still be forwarded.

In some embodiments, after the PGW determines that the status of the data service switch of the user equipment UE is that the data service switch is turned off, the following step may be further performed:

adding, by the PGW, first indication information to the charging data record CDR generated according to the first data packet, where the first indication information is used to notify the charging system that the data service switch of the UE is turned off.

After the PGW determines that the status of the data service switch of the UE is that the data service switch is turned off, the PGW notifies the charging system that the data service switch of the UE is turned off.

Figure 4B:
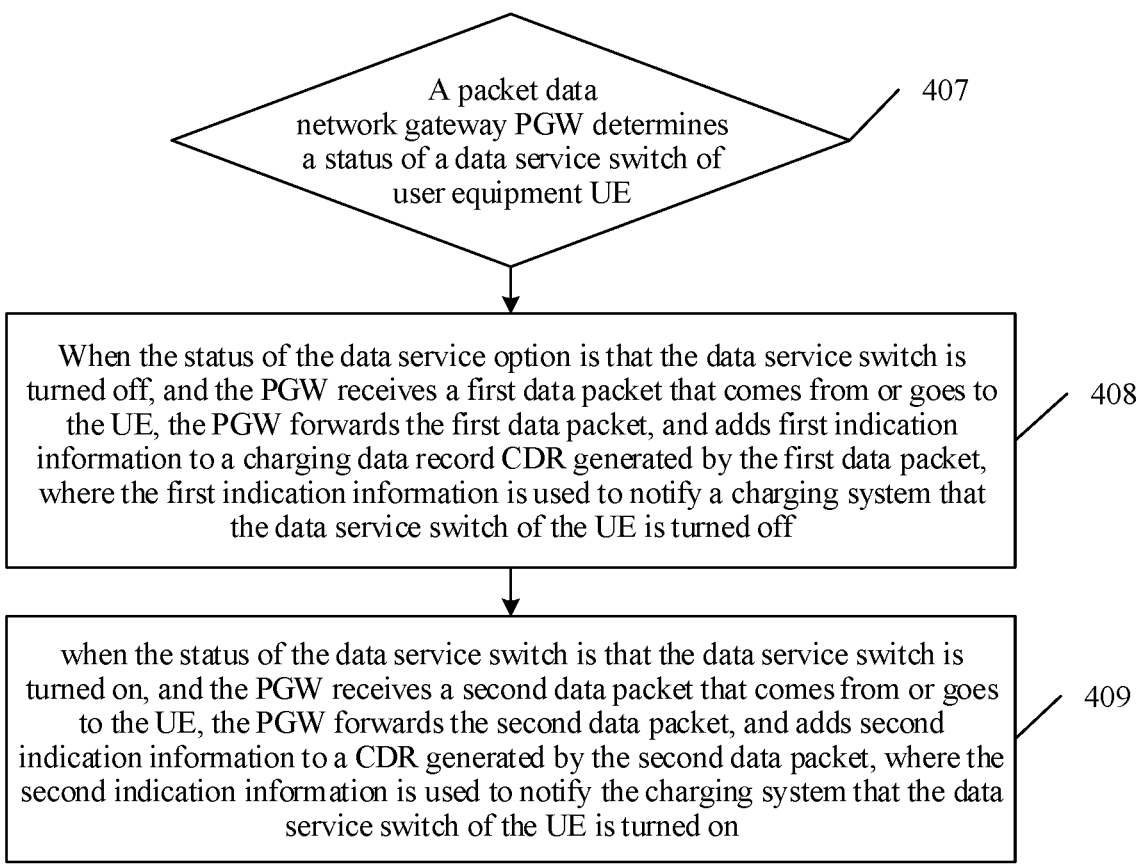
FIG. 4b is a schematic flowchart of another data service control method according to an embodiment of this application.

Referring to FIG. 4b, FIG. 4b is a schematic flowchart of another data service control method according to an embodiment of this application. As shown in FIG. 4b, the method includes the following steps.

407: A packet data network gateway PGW determines a status of a data service switch of user equipment UE, where the status of the data service switch includes that the data service switch is turned on or that the data service switch is turned off.

For step 407 in this embodiment of this application, refer to step 201 in FIG. 2a. Details are not described again in this embodiment of this application.

408: When the status of the data service switch is that the data service switch is turned off, and the PGW receives a first data packet that comes from or goes to the UE, the PGW forwards the first data packet, and adds first indication information to a charging data record CDR generated according to the first data packet, where the first indication information is used to notify a charging system that the data service switch of the UE is turned off.

For step 408 in this embodiment of this application, refer to step 402 in FIG. 4. Details are not described again in this embodiment of this application.

In some embodiments, before step 408 is performed, the following step may be further performed:

determining, by the PGW, that a service registration status of the UE is an IMS registration state.

In some embodiments, the PGW may determine the service registration status of the UE based on indication information that indicates the service registration status of the UE and that is sent by the UE by using an MME. For example, the UE may send a service establishment message (the service establishment message may be an attach request message, a bearer resource change message, a PDN connection establishment request message, or the like) to the MME. The service establishment message includes service registration status indication information, and the service registration status indication information is used to indicate the service registration status of the UE. In some embodiments, the UE may add the service registration status indication information to a PCO sent to the MME, and the service registration status indication information is used to indicate the service registration status of the UE. The MME transparently transmits the PCO to an SGW by using the service establishment message. The SGW then transparently transmits the PCO to the PGW by using the service establishment message. After obtaining the PCO, the PGW obtains the service registration status indication information carried in the PCO. In this way, the PGW learns of the service registration status of the UE.

In some embodiments, after the charging system receives the charging data record CDR generated according to the first data packet coming from the PGW, the charging system determines whether the first data packet belongs to an IMS exempt service.

The IMS exempt service is an operator service set that can still be used by the UE even if the data service switch of the UE in the IMS registration state is turned off. The IMS exempt service set may be pre-configured in the charging system.

Based on the first indication information in the charging data record CDR, the charging system learns that the data service switch of the UE is turned off and learns of a start-stop time period within which the data service switch of the UE is turned off. The charging system checks whether the UE uses the IMS exempt service within the period of time. If the UE uses the IMS exempt service, the charging system charges the UE; or otherwise, the charging system does not charge the UE, to be specific, does not charge for all charging data records CDRs including the first indication information.

Concerning how the charging system determines whether the UE uses the IMS exempt service during the turn-off of the data service switch of the UE, in some embodiments, the charging system determines whether there is a record of interaction between the UE and a server that corresponds to the IMS exempt service. If yes, the UE uses the IMS exempt service. If no, the UE does not use the IMS exempt service.

In this embodiment of this application, after the charging system receives, from the PGW, the charging data record CDR generated according to the first data packet, based on the first indication information in the charging data record CDR, the charging system learns that the data service switch of the UE is turned off and learns of the start-stop time period within which the data service switch of the UE is turned off. The charging system checks whether the UE uses the IMS exempt service within the period of time. If the UE uses the IMS exempt service, the charging system charges the UE; or otherwise, the charging system does not charge the UE.

In some embodiments, after step 408 is performed, step 409 may be further performed.

409: When the status of the data service switch is that the data service switch is turned on, and the PGW receives a second data packet that comes from or goes to the UE, the PGW forwards the second data packet, and adds second indication information to a CDR generated according to the second data packet, where the second indication information is used to notify the charging system that the data service switch of the UE is turned on.

For step 409 in this embodiment of this application, refer to step 403 in FIG. 4. Details are not described again in this embodiment of this application.

Figure 5:
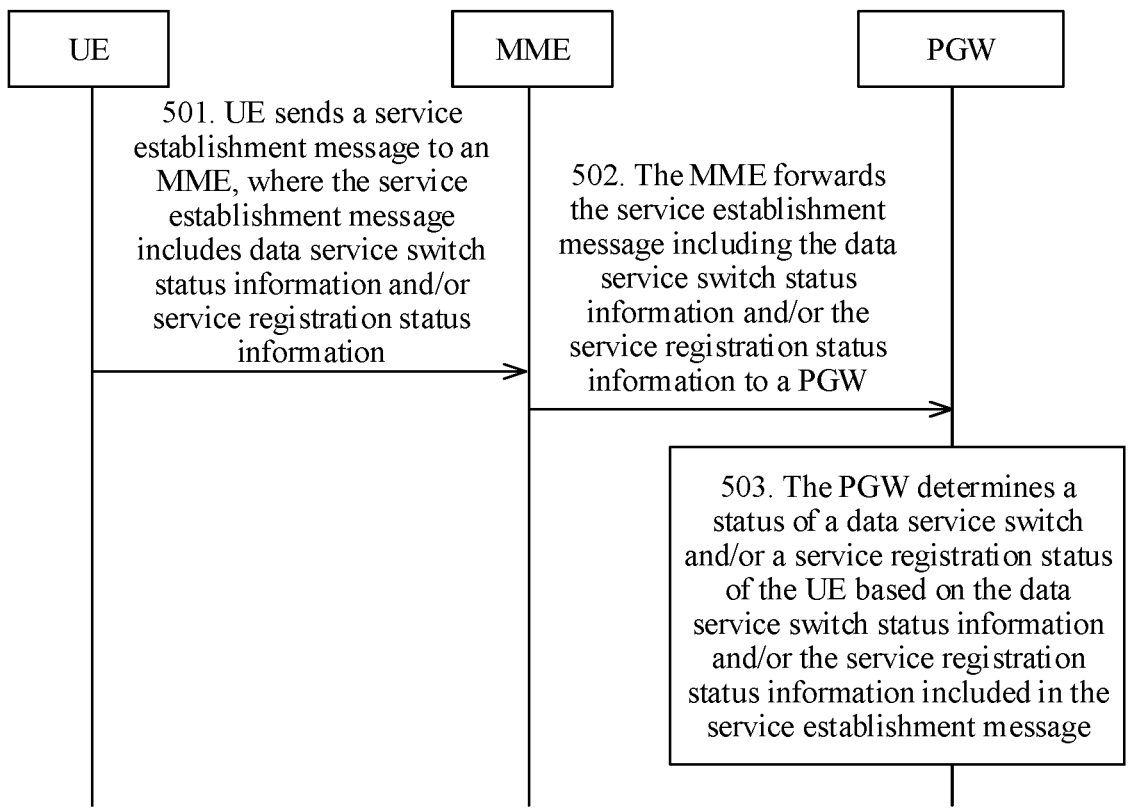
FIG. 5 is a schematic flowchart of another data service control method according to an embodiment of this application.

Referring to FIG. 5, FIG. 5 is a schematic flowchart of another data service control method according to an embodiment of this application. As shown in FIG. 5, the method includes the following steps.

501: UE sends a service establishment message to an MME, where the service establishment message includes data service switch status indication information and/or service registration status indication information, the data service switch status indication information is used to indicate a status of a data service switch of the UE to a PGW, the service registration status indication information is used to indicate a service registration status of the UE, and the status of the data service switch includes that the data service switch is turned on or that the data service switch is turned off.

In this embodiment of this application, the UE may send the service establishment message including the data service switch status indication information to the MME, or may send the service establishment message including the service registration status indication information to the MME, or may send the service establishment message including the data service switch status indication information and the service registration status indication information to the MME. The UE may first send a first service establishment message including the data service switch status indication information to the MME, and then send a second service establishment message including the service registration status indication information to the MME; or the UE may first send a first service establishment message including the service registration status indication information to the MME, and then send a second service establishment message including the data service switch status indication information to the MME. The UE may first send a first service establishment message including the data service switch status indication information or the service registration status indication information to the MME, and then send a second service establishment message including the data service switch status indication information and the service registration status indication information to the MME; or the UE may first send a second service establishment message including the data service switch status indication information and the service registration status indication information to the MME, and then send a first service establishment message including the data service switch status indication information or the service registration status indication information to the MME.

The data service switch status indication information is used to indicate the status of the data service switch of the UE. The status of the data service switch of the UE includes that the data service switch of the UE is turned on or that the data service switch of the UE is turned off. The service registration status indication information is used to indicate the service registration status of the UE. The service registration status of the UE may include: only a CSFB combined registration state, an IMS registration state, only an EPS registration state, and the like.

The data service switch status indication information and/or the service registration status indication information are/is used by the PGW to determine whether to discard the first data packet that is received by the PGW and that comes from or goes to the UE. After the UE sends the service establishment message to the MME, the MME may send the data service switch status indication information and/or the service registration status indication information in the service establishment message to the PGW. The PGW determines, based on the data service switch status indication information and/or the service registration status indication information, whether to discard the first data packet that is received by the PGW and that comes from or goes to the UE. In some embodiments, the service establishment message includes a protocol configuration option PCO, and the PCO includes the data service switch status indication information and/or the service registration status indication information. For example, the UE may add the data service switch status indication information and/or the service registration status indication information to the PCO sent to the MME, the MME transparently transmits (transparent transmission means that the PCO is not processed in a transmission process) the PCO to an SGW, the SGW then transparently transmits the PCO to the PGW, and after obtaining the PCO, the PGW obtains the data service switch status indication information and/or the service registration status indication information carried in the PCO. In this way, the PGW learns of the status of the data service switch and/or the service registration status of the UE.

The PGW may forward or discard, based on the status of the data service switch and/or the service registration status of the UE, the first data packet that comes from or goes to the UE. Alternatively, the PGW may determine, based on the status of the data service switch of the UE, whether to add first indication information to a charging data record CDR generated according to the first data packet that is received by the PGW and that comes from or goes to the UE, and the first indication information is used to notify a charging system that the data service switch of the UE is turned off. For specific implementation details, refer to the embodiment parts of FIG. 2a, FIG. 2b, FIG. 2c, FIG. 3, and FIG. 4.

In this embodiment of this application, the service establishment message may include one or more of an attach request message, a bearer resource change message, and a PDN connection establishment request message. The attach request message includes the data service switch status indication information, the bearer resource change message includes the data service switch status indication information and/or the service registration status indication information, and the PDN connection establishment request message includes the data service switch status indication information and/or the service registration status indication information. When the UE needs to attach to an LTE network, the UE sends the attach request message to the MME. When the UE needs to request to change a bearer resource, the UE sends the bearer resource change message to the MME. When the UE needs to establish a PDN connection, the UE sends the PDN connection establishment request message to the MME.

In some embodiments, the service registration status of the UE includes: only the CSFB combined registration state, the IMS registration state, or only the EPS registration state. Only the CSFB combined registration state includes a state that in a registration process, the UE is registered with both a circuit switched CS network and an EPS network, but is not registered with an IMS network. Only the EPS registration state includes that in a registration process, the UE is registered with only the EPS network. The IMS registration state includes that the UE is registered with the EPS network and the IMS network.

In some embodiments, step 501 may include:
when the UE determines that the status of the data service switch changes, sending, by the UE, the service establishment message including the data service switch status indication information to the MME.

In this embodiment of this application, when a user switches the status of the data service switch of the UE from being turned on to being turned off, or a user switches the status of the data service switch of the UE from being turned off to being turned on, the UE sends the service establishment message including the data service switch status indication information to the MME. For example, when the user switches the status of the data service switch of the UE from being turned on to being turned off, the UE sends the service establishment message to the MME, the service establishment message includes the data service switch status indication information, and the data service switch status indication information is used to indicate that the data service switch of the UE is turned off. When the user switches the status of the data service switch of the UE from being turned off to being turned on, the UE sends the service establishment message to the MME, the service establishment message includes the data service switch status indication information, and the data service switch status indication information is used to indicate that the data service switch of the UE is turned on. When the status of the data service switch of the UE changes, the UE may notify the status of the data service switch of the UE to the PGW in time.

In some embodiments, step 501 may include:
when the UE determines that the service registration status changes, sending, by the UE, the service establishment message including the service registration status indication information to the MME.

In this embodiment of this application, when the service registration status of the UE changes, for example, when the service registration status of the UE changes from only the EPS registration state to only the CSFB combined registration state, the UE sends the service establishment message including the service registration status indication information to the MME, and the service registration status indication information is used to indicate that the service registration status of the UE is only the CSFB combined registration state. When the service registration status of the UE changes from only the CSFB combined registration state to only the EPS registration state, the UE sends the service establishment message including the service registration status indication information to the MME, and the service registration status indication information is used to indicate that the service registration status of the UE is only the EPS registration state. When the service registration status of the UE changes, the UE may notify the service registration status of the UE to the PGW in time.

In some embodiments, step 501 may include:
when the UE determines that both the status of the data service switch and the service registration status change, sending, by the UE, the service establishment message including the data service switch status indication information and the service registration status indication information to the MME.

For example, when the UE determines that the status of the data service switch is switched from being turned on to being turned off, and the service registration status changes from only the EPS registration state to only the CSFB combined registration state, the UE sends the service establishment message including the data service switch status indication information and the service registration status indication information to the MME, the data service switch status indication information is used to indicate that the data service switch of the UE is turned off, and the service registration status indication information is used to indicate that the service registration status of the UE is only the CSFB combined registration state. When both the status of the data service switch and the service registration status of the UE change, the UE may notify the status of the data service switch and the service registration status of the UE to the PGW in time.

In some embodiments, step 501 may include:
when the UE determines that a default APN PDN connection is successfully established, and the UE determines that CSFB combined registration is completed, sending, by the UE, the service establishment message to the MME, where the service establishment message includes the service registration status indication information, and the service registration status indication information is used to indicate that the service registration status of the UE is only the CSFB combined registration state.

In this embodiment of this application, when the default APN PDN connection is successfully established, and the UE determines that the CSFB combined registration is completed, the UE can perform a service that is based on the default APN PDN connection.

In some embodiments, step 501 may include:

when the UE determines that an IMS APN PDN connection is successfully established, and the UE determines that IMS registration succeeds, sending, by the UE, the service establishment message to the MME, where the service establishment message includes the service registration status indication information, and the service registration status indication information is used to indicate that the service registration status of the UE is the IMS registration state.

In this embodiment of this application, when the IMS APN PDN connection is successfully established, and the UE determines that the IMS registration succeeds, the UE can perform a service that is based on the IMS APN PDN connection.

Further, when the UE moves from a Long Term Evolution (LTE for short) network to a 2/3G network, the UE accesses the 2/3G network, and when the UE determines that the status of the data service switch of the UE is a turned-off state, the UE sends a PDP deactivation message to a serving GPRS support node SGSN of the 2/3G network, to delete a PDP context of the UE; or the UE sends a routing area update message to a serving GPRS support node SGSN of the 2/3G network, where the routing area update message carries the status of the data service switch of the UE.

When the UE moves from the 2/3G network to the Long Term Evolution network, the UE accesses the Long Term Evolution network. When the UE determines that the status of the data service switch of the UE is that the data service switch is turned off, the UE sends an attach message to the MME, to access the Long Term Evolution network.

502: The MME forwards the data service switch status indication information and/or the service registration status indication information to the PGW.

In this embodiment of this application, after the MME receives the service establishment message sent by the UE, the MME extracts the data service switch status indication information and/or the service registration status indication information from the service establishment message, and the MME forwards the data service switch status indication information and/or the service registration status indication information to the PGW.

In some embodiments, step 502 may include:

transferring, by the MME, the status of the data service switch and/or the service registration status to the packet data network gateway PGW by using the PCO.

In this embodiment of this application, in some embodiments, the MME transparently transmits the status of the data service switch and/or the service registration status to the SGW by using the PCO (transparent transmission means that the PCO is not processed in a transmission process), and the SGW then transparently transmits the status of the data service switch and/or the service registration status to the PGW by using the PCO. The UE may transmit the status of the data service switch and/or the service registration status of the UE by using the PCO, thereby improving transmission security.

503: The PGW determines the status of the data service switch and/or the service registration status of the UE based on the data service switch status indication information and/or the service registration status indication information.

In this embodiment of this application, after the PGW receives the data service switch status indication information and/or the service registration status indication information sent by the MME, the PGW determines the status of the data service switch of the UE based on the data service switch status indication information used to indicate the status of the data service switch of the UE, and the PGW determines the service registration status of the UE based on the service registration status indication information used to indicate the service registration status of the UE.

During implementation of the method shown in FIG. 5, the UE may send the service establishment message including the data service switch status indication information and/or the service registration status indication information to the MME, the MME forwards the data service switch status indication information and/or the service registration status indication information to the PGW, and the PGW determines the status of the data service switch and/or the service registration status of the UE based on the data service switch status indication information and/or the service registration status indication information. The UE may notify the status of the data service switch and/or the service registration status of the UE to the PGW.

Figure 6:
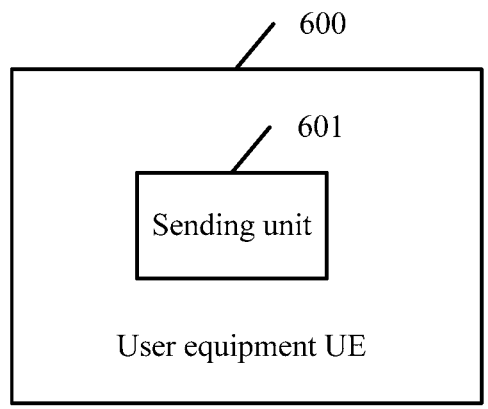
FIG. 6 is a schematic structural diagram of UE according to an embodiment of this application.

Referring to FIG. 6, FIG. 6 is a schematic structural diagram of UE according to an embodiment of this application. As shown in FIG. 6, the UE 600 may include a sending unit 601.

The sending unit 601 is configured to send a service establishment message to an MME. The service establishment message includes data service switch status indication information and/or service registration status indication information, the data service switch status indication information is used to indicate a status of a data service switch of the UE, the status of the data service switch includes that the data service switch is turned on or that the data service switch is turned off, and the service registration status indication information is used to indicate a service registration status of the UE.

During implementation of the UE shown in FIG. 6, the UE may notify the status of the data service switch and/or the service registration status of the UE to a PGW by using the MME.

Based on the same inventive concept, a principle used by the UE to resolve a problem is similar to the data service control method in the method embodiment of this application. Therefore, for the implementation of the UE, refer to the implementation of the method. Repeated content is not described again.

Figure 7:
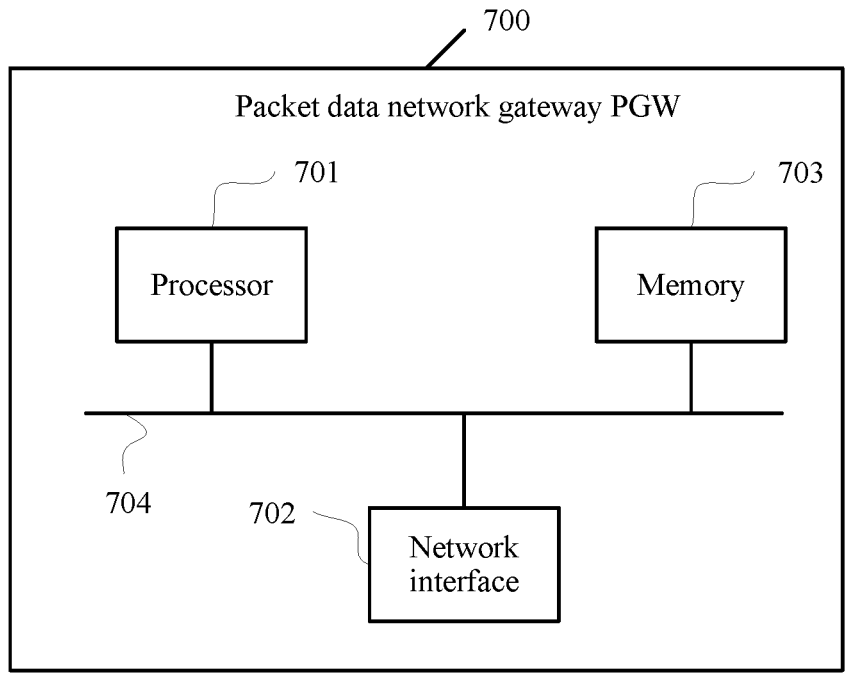
FIG. 7 is a schematic structural diagram of a PGW according to an embodiment of this application.

Referring to FIG. 7, FIG. 7 is a schematic structural diagram of a PGW according to an embodiment of this application. The PGW 700 shown in FIG. 7 includes: at least one processor 701, such as a CPU, at least one network interface 702, a memory 703, and at least one communications bus 704. The communications bus 704 is configured to implement connection and communication between these components. The network interface 702 may be a wired interface, such as a fiber distributed data interface (FDDI for short) or a Gigabit Ethernet (GE for short) interface. Alternatively, the network interface 702 may be a wireless interface. The memory 703 includes, but is not limited to, a random access memory (RAM), a read-only memory (ROM), an erasable programmable read-only memory (EPROM or a flash memory), or a portable read-only memory (CD-ROM). The processor 701 may include one or more central processing units (CPU for short). When the processor 701 is one CPU, the CPU may be a single-core CPU, or may be a multi-core CPU. The memory 703 is configured to store a program and data.

In this embodiment of this application, the network interface 702 is configured to receive a first data packet that comes from or goes to UE.

The processor 701 is configured to determine a status of a data service switch of the user equipment UE. The status of the data service switch includes that the data service switch is turned on or that the data service switch is turned off.

The processor 701 is further configured to: when the processor 701 determines that the status of the data service switch is that the data service switch is turned off, and the network interface 702 receives the first data packet that comes from or goes to the UE, determine whether the first data packet belongs to a specified type.

The processor 701 is further configured to forward the first data packet when the processor 701 determines that the first data packet belongs to the specified type.

The processor 701 is further configured to discard the first data packet when the processor 701 determines that the first data packet does not belong to the specified type.

In an embodiment, that the processor 701 determines whether the first data packet belongs to the specified type is in some embodiments:

when the processor 701 determines that a service registration status of the UE is an IMS registration state, the processor 701 determines whether the first data packet belongs to the specified type.

In an embodiment, the processor 701 is further configured to: after the processor 701 determines that the service registration status of the UE is the IMS registration state, when the status of the data service switch of the UE is that the data service switch is turned off, send a first status notification message to a IP multimedia subsystem IMS network by using the network interface 702. The first status notification message is used to notify the IMS network that the status of the data service switch of the UE is that the data service switch is turned off.

In an embodiment, the processor 701 is further configured to:

after the processor 701 forwards the first data packet, notify, by using the network interface 702, a charging system that the status of the data service switch of the UE is that the data service switch is turned off.

In an embodiment, that the processor 701 notifies, by using the network interface 702, the charging system that the status of the data service switch of the UE is that the data service switch is turned off is in some embodiments:

the processor 701 adds first indication information to a charging data record CDR generated according to the first data packet, where the first indication information is used to notify the charging system that the data service switch of the UE is turned off; or the processor 701 notifies, in a first credit control request CCR message, the charging system that the data service switch of the UE is turned off.

In an embodiment, that the processor 701 determines whether the first data packet belongs to the specified type is in some embodiments:

the processor 701 determines whether the first data packet includes one or more of the following data packets:

an uplink data packet that is sent by the UE to a packet data network PDN network corresponding to an IMS access point name APN or a downlink data packet that is sent by a PDN network corresponding to an IMS APN to the UE;

a data packet coming from an address of a specified service server and going to the UE;

a data packet used to manage an IP address; and a data packet of a specified service type.

In an embodiment, that the processor 701 determines whether the first data packet is the data packet of the specified service type is in some embodiments:

the processor 701 performs deep packet inspection DPI on the first data packet, and determines whether the first data packet is the data packet of the specified service type; or the processor 701 determines, based on service type indication information included in the first data packet, whether the first data packet is the data packet of the specified service type.

In an embodiment, the network interface 702 is further configured to receive a second data packet that comes from or goes to the UE; and the processor 701 is further configured to: after the processor 701 determines that the status of the data service switch is switched from the state that the data service switch is turned off to a state that the data service switch is turned on, and the network interface 702 receives the second data packet that comes from or goes to the UE, forward the second data packet.

In an embodiment, the processor 701 is further configured to:

after the processor 701 determines that the service registration status of the UE is the IMS registration state, when the status of the data service switch of the UE is that the data service switch is turned on, send a second status notification message to the IP multimedia subsystem IMS network by using the network interface 702, where the second status notification message is used to notify the IMS network that the status of the data service switch of the UE is that the data service switch is turned on.

In an embodiment, the processor 701 is further configured to: after forwarding the second data packet, notify, by using the network interface 702, the charging system that the status of the data service switch of the UE is that the data service switch is turned on.

In an embodiment, a manner used by the processor 701 to notify, by using the network interface 702, the charging system that the status of the data service switch of the UE is that the data service switch is turned on is in some embodiments:

adding, by the processor 701, second indication information to a charging data record CDR generated according to the second data packet, where the second indication information is used to notify the charging system that the data service switch of the UE is turned on; or notifying, by the processor 701 in a second CCR message, the charging system that the data service switch of the UE is turned on.

In an embodiment, the network interface 702 is further configured to receive a third data packet that comes from or goes to the UE; and the processor 701 is further configured to: after the processor 701 determines that the status of the data service switch is switched from the state that the data service switch is turned off to the state that the data service switch is turned on, and the network interface 702 receives the third data packet that comes from or goes to the UE, forward the third data packet, and add third indication information to a CDR generated according to the third data packet, where the third indication information is used to notify the charging system that the data service switch of the UE is turned on.

In an embodiment, that the processor 701 determines the status of the data service switch of the UE is in some embodiments:

the processor 701 receives a protocol configuration option PCO sent by the UE by using a mobility management entity MME, where the PCO includes data service switch status indication information, and the data service switch status indication information is used to indicate the status of the data service switch of the UE.

During implementation of the PGW shown in FIG. 7, when the status of the data service switch is that the data service switch is turned off, an unnecessary data packet coming from or going to the UE may be discarded, thereby avoiding an unnecessary charge for the UE, and saving data traffic of the UE. In addition, a necessary data packet (the data packet of the specified type or the data packet used to manage an IP address) is continuously forwarded without affecting an important service and management of an IP address.

Figure 7A:
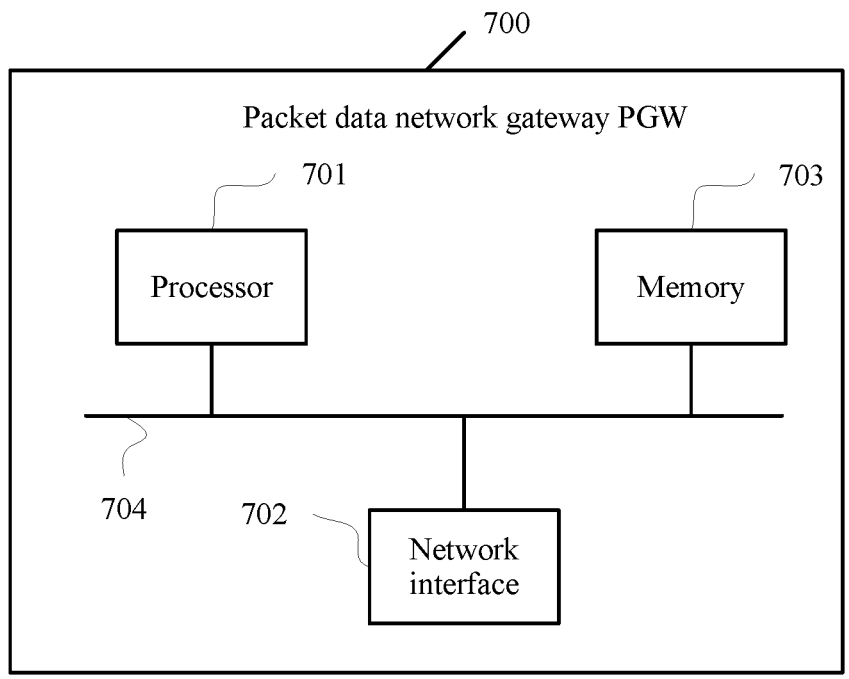
FIG. 7a is a schematic structural diagram of another PGW according to an embodiment of this application.

Referring to FIG. 7a, FIG. 7a is a schematic structural diagram of another PGW according to an embodiment of this application. The PGW 700 shown in FIG. 7a includes: at least one processor 701, such as a CPU, at least one network interface 702, a memory 703, and at least one communications bus 704. The communications bus 704 is configured to implement connection and communication between these components. The network interface 702 may be a wired interface, such as a fiber distributed data interface (FDDI for short) or a Gigabit Ethernet (GE for short) interface. Alternatively, the network interface 702 may be a wireless interface. The memory 703 includes, but is not limited to, a random access memory (RAM), a read-only memory (ROM), an erasable programmable read-only memory (EPROM or a flash memory), or a portable read-only memory (CD-ROM). The processor 701 may include one or more central processing units (CPU for short). When the processor 701 is one CPU, the CPU may be a single-core CPU, or may be a multi-core CPU. The memory 703 is configured to store a program and data.

In this embodiment of this application, the network interface 702 is configured to receive a first data packet that comes from or goes to UE.

The processor 701 is configured to forward the first data packet.

The processor 701 is further configured to determine whether the first data packet belongs to a specified type.

The processor 701 is further configured to: when the first data packet belongs to the specified type, add fourth indication information to a charging data record CDR generated according to the first data packet. The fourth indication information is used to instruct a charging system not to charge for the first data packet.

In an embodiment, that the processor 701 determines whether the first data packet belongs to the specified type is in some embodiments:

the processor 701 determines whether the first data packet includes one or more of the following data packets:

an uplink data packet that is sent by the UE to a packet data network PDN network corresponding to an IMS access point name APN or a downlink data packet that is sent by a PDN network corresponding to an IMS APN to the UE;

a data packet coming from an address of a specified service server and going to the UE;

a data packet used to manage an IP address; and a data packet of a specified service type.

In an embodiment, a manner used by the processor 701 to determine whether the first data packet is the data packet of the specified service type is in some embodiments:

performing, by the processor 701, deep packet inspection DPI on the first data packet, and determining whether the first data packet is the data packet of the specified service type; or determining, by the processor 701 based on service type indication information included in the first data packet, whether the first data packet is the data packet of the specified service type.

In an embodiment, the processor 701 is further configured to: before forwarding the first data packet, determine that a status of a data service switch of the user equipment UE is that the data service switch is turned off.

In an embodiment, the processor 701 is further configured to: after determining that the status of the data service switch of the user equipment UE is that the data service switch is turned off, add first indication information to a charging data record CDR generated according to the first data packet. The first indication information is used to notify the charging system that the data service switch of the UE is turned off.

During implementation of the PGW shown in FIG. 7a, the PGW may notify the charging system when the status of the data service switch of the UE changes, the charging system determines whether the UE uses an IMS exempt service during the turn-off of the data service switch, to determine whether to charge for the UE, and if the UE uses the IMS exempt service during the turn-off of the data service switch, the charging system charges for the UE; or otherwise, the charging system does not charge for the UE.

Figure 7B:
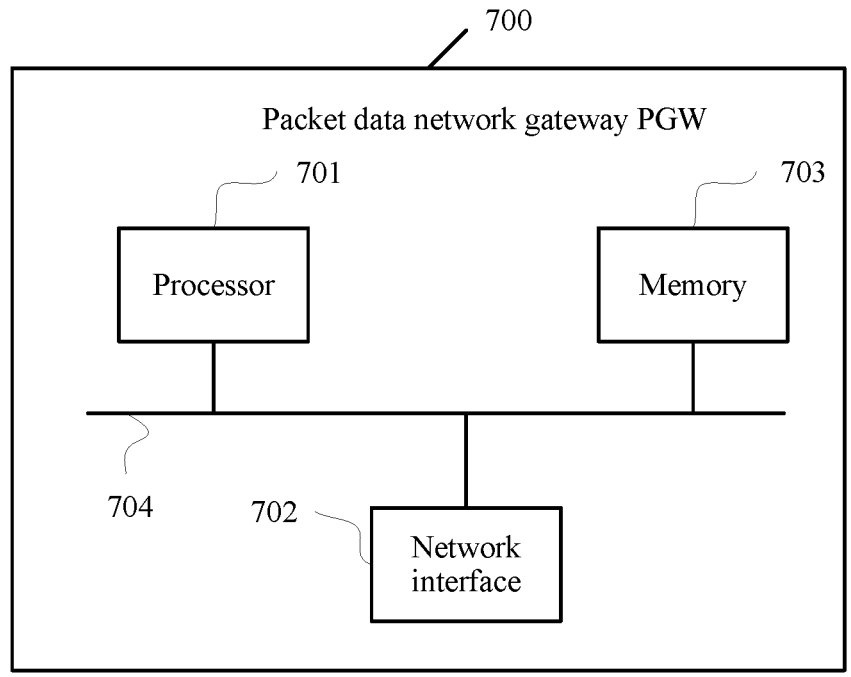
FIG. 7b is a schematic structural diagram of another PGW according to an embodiment of this application.

Referring to FIG. 7b, FIG. 7b is a schematic structural diagram of another PGW according to an embodiment of this application. The PGW 700 shown in FIG. 7b includes: at least one processor 701, such as a CPU, at least one network interface 702, a memory 703, and at least one communications bus 704. The communications bus 704 is configured to implement connection and communication between these components. The network interface 702 may be a wired interface, such as a fiber distributed data interface (FDDI for short) or a Gigabit Ethernet (GE for short) interface. Alternatively, the network interface 702 may be a wireless interface. The memory 703 includes, but is not limited to, a random access memory (RAM), a read-only memory (ROM), an erasable programmable read-only memory (EPROM or a flash memory), or a portable read-only memory (CD-ROM). The processor 701 may include one or more central processing units 701 (CPU for short). When the processor 701 is one CPU, the CPU may be a single-core CPU, or may be a multi-core CPU. The memory 703 is configured to store a program and data.

In this embodiment of this application, the network interface 702 is configured to receive a first data packet that comes from or goes to UE.

The processor 701 is configured to determine a status of a data service switch of the user equipment UE. The status of the data service switch includes that the data service switch is turned on or that the data service switch is turned off.

The processor 701 is further configured to: when the status of the data service switch is that the data service switch is turned off, and the network interface 702 receives the first data packet that comes from or goes to the UE, forward the first data packet, and add first indication information to a charging data record CDR generated according to the first data packet. The first indication information is used to notify a charging system that the data service switch of the UE is turned off.

In an embodiment, the processor 701 is further configured to: before forwarding the first data packet, determine that a service registration status of the UE is an IMS registration state.

In an embodiment, the network interface 702 is further configured to receive a second data packet that comes from or goes to the UE; and the processor 701 is further configured to: when the status of the data service switch is that the data service switch is turned on, and the network interface 702 receives the second data packet that comes from or goes to the UE, forward the second data packet, and add second indication information to a CDR generated according to the second data packet, where the second indication information is used to notify the charging system that the data service switch of the UE is turned on.

During implementation of the PGW shown in FIG. 7b, after the data service switch of the UE is turned off, after receiving the first data packet that comes from or goes to the UE, the PGW directly forwards the first data packet, and the PGW does not charge for the first data packet, but notifies the charging system that the data service switch of the UE is turned off, so that the charging system charges for the first data packet according to a charging standard used after the data service switch of the UE is turned off. After the status of the data service switch of the UE is switched from being turned off to being turned on, the charging system is notified that the data service switch of the UE is turned on, so that the charging system charges for the second data packet according to a charging standard used after the data service switch of the UE is turned on.

Figure 8:
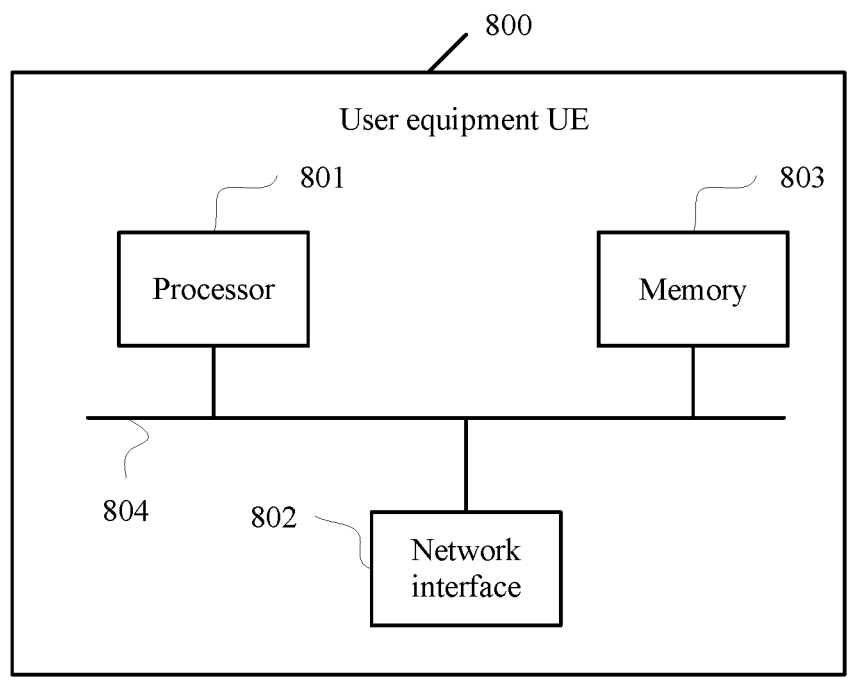
FIG. 8 is a schematic structural diagram of another UE according to an embodiment of this application.

Referring to FIG. 8, FIG. 8 is a schematic structural diagram of another UE according to an embodiment of this application. The UE 800 shown in FIG. 8 includes: at least one processor 801, such as a CPU, at least one network interface 802, a memory 803, and at least one communications bus 804. The communications bus 804 is configured to implement connection and communication between these components. The network interface 802 may be a wired interface, such as a fiber distributed data interface (FDDI for short) or a Gigabit Ethernet (GE for short) interface. Alternatively, the network interface 802 may be a wireless interface. The memory 803 includes, but is not limited to, a random access memory (RAM), a read-only memory (ROM), an erasable programmable read-only memory (EPROM or a flash memory), or a portable read-only memory (CD-ROM). The processor 801 may include one or more central processing units (CPU for short). When the processor 801 is one CPU, the CPU may be a single-core CPU, or may be a multi-core CPU. The memory 803 is configured to store a program and data.

In this embodiment of this application, the network interface 802 is configured to send a service establishment message to an MME.

The processor 801 is configured to send the service establishment message to the MME by using the network interface 802.

The service establishment message includes data service switch status indication information and/or service registration status indication information. The data service switch status indication information and/or the service registration status indication information are/is used by a PGW to determine whether to discard the first data packet that is received by the PGW and that comes from or goes to the UE. The data service switch status indication information is used to indicate a status of a data service switch of the UE. The status of the data service switch includes that the data service switch is turned on or that the data service switch is turned off. The service registration status indication information is used to indicate a service registration status of the UE.

In an embodiment, the service registration status of the UE includes: only a CSFB combined registration state, an IMS registration state, or only an EPS registration state. Only the CSFB combined registration state includes a state that in a registration process, the UE is registered with both a circuit switched CS network and an EPS network, but is not registered with an IMS network.

In an embodiment, the processor 801 is further configured to determine whether the status of the data service switch of the UE changes, and the processor 801 is further configured to determine whether the service registration status of the UE changes; and that the processor 801 sends the service establishment message to the MME by using the network interface 802 is in some embodiments:

when the processor 801 determines that the status of the data service switch changes, the processor 801 sends, by using the network interface 802, the service establishment message including the data service switch status indication information to the MME; or when the processor 801 determines that the service registration status changes, the processor 801 sends, by using the network interface 802, the service establishment message including the service registration status indication information to the MME; or when the processor 801 determines that both the status of the data service switch and the service registration status change, the processor 801 sends, by using the network interface 802, the service establishment message including the data service switch status indication information and the service registration status indication information to the MME.

In an embodiment, the processor 801 is further configured to determine whether a default APN PDN connection is successfully established;

the processor 801 is further configured to determine whether CSFB combined registration is completed; and that the processor 801 sends the service establishment message to the MME by using the network interface 802 is in some embodiments:

when the processor 801 determines that the default APN PDN connection is successfully established, and the processor 801 determines that the CSFB combined registration is completed, the processor 801 sends the service establishment message to the MME by using the network interface 802, where the service establishment message includes the service registration status indication information, and the service registration status indication information is used to indicate that the service registration status of the UE is only the CSFB combined registration state.

In an embodiment, the processor 801 is further configured to determine whether an IMS APN PDN connection is successfully established;

the processor 801 is further configured to determine whether IMS registration succeeds; and that the processor 801 sends the service establishment message to the MME by using the network interface 802 is in some embodiments:

when the processor 801 determines that the IMS APN PDN connection is successfully established, and the processor 801 determines that the IMS registration succeeds, the processor 801 sends the service establishment message to the MME by using the network interface 802, where the service establishment message includes the service registration status indication information, and the service registration status indication information is used to indicate that the service registration status of the UE is the IMS registration state.

In an embodiment, the service establishment message includes a protocol configuration option PCO, and the PCO includes the data service switch status indication information and/or the service registration status indication information.

In an embodiment, the service establishment message may include one or more of an attach request message, a bearer resource change message, and a PDN connection establishment request message. The attach request message includes the data service switch status indication information, the bearer resource change message includes the data service switch status indication information and/or the service registration status indication information, and the PDN connection establishment request message includes the data service switch status indication information and/or the service registration status indication information.

In an embodiment, the processor 801 is further configured to: when the UE moves from a Long Term Evolution network to a 2/3G network, access the 2/3G network by using the network interface 802; and the processor 801 is further configured to: when determining that the status of the data service switch of the UE is that the data service switch is turned off, send a Packet Data Protocol PDP deactivation message to a serving GPRS support node SGSN of the 2/3G network by using the network interface 802, to delete a PDP context of the UE; or the processor 801 is further configured to send a routing area update message to a serving GPRS support node SGSN of the 2/3G network by using the network interface 802, where the routing area update message carries the status of the data service switch of the UE.

In an embodiment, the processor 801 is further configured to: when the UE moves from the 2/3G network to the Long Term Evolution network, access the Long Term Evolution network by using the network interface 802; and the processor 801 is further configured to: when determining that the status of the data service switch of the UE is that the data service switch is turned off, send an attach message to the MME by using the network interface 802.

During implementation of the UE shown in FIG. 8, the UE may notify the status of the data service switch and/or the service registration status of the UE to the PGW.

Persons of ordinary skill in the art may understand that, all or a part of the steps in each method of the foregoing embodiments may be implemented by a program instructing related hardware. The program may be stored in a computer readable storage medium. The storage medium includes a read-only memory (ROM for short), a random access memory (RAM for short), a programmable read-only memory (PROM for short), an erasable programmable read-only memory (EPROM for short), a one-time programmable read-only memory (OTPROM for short), an electrically-erasable programmable read-only memory (EEPROM for short), a compact disc read-only memory (CD-ROM for short) or another optical disc memory, magnetic disk memory, and magnetic tape memory, or any other computer readable medium that can be configured to carry or store data.

The data service control method and the related device disclosed in the embodiments of this application are described above in detail. The principle and implementations of this application are described herein through specific examples. The description about the embodiments is merely provided to help understand the method and core ideas of this application. In addition, persons of ordinary skill in the art can make modifications to this application in terms of the specific implementations and application scopes based on the ideas of this application. To sum up, the content of specification shall not be construed as a limit to this application.

What is claimed is:

1. A data service control method, comprising:
   determining, by a packet data network (PDN) gateway (PGW), a status of a data service switch of user equipment (UE), wherein the status of the data service switch indicates that the data service switch is turned on or that the data service switch is turned off;
   receiving, by the PGW, a data packet to be transmitted to the UE;
   determining, by the PGW, whether the data packet belongs to a specified type when the status of the data service switch indicates that the data service switch is turned off;
   forwarding, by the PGW, the data packet if the data packet belongs to the specified type; and
   transmitting, by the PGW, a charging data record (CDR) generated according to the data packet to a charging system, wherein the CDR comprises indication information notifying the charging system that the data service switch of the UE is turned off.

2. The method according to claim 1, wherein the determining, by the PGW, whether the data packet belongs to a specified type comprises:
   determining, by the PGW, whether the data packet is a downlink data packet from a PDN network corresponding to an IP multimedia subsystem access point name (IMS APN).

3. The method according to claim 2, wherein determining, by the PGW, whether the data packet is the data packet of a specified service type comprises:
   performing, by the PGW, deep packet inspection (DPI) on the data packet, and determining whether the data packet is the data packet of the specified service type.

4. The method according to claim 1, further comprising:
   receiving, by the PGW, a protocol configuration option (PCO) from the UE, wherein the PCO comprises data service switch status indication information indicating that the data service switch is turned on or that the data service switch is turned off.

5. The method according to claim 1, wherein the data packet is data packet not charged by the charging system.

6. An apparatus, comprising at least one processor and a memory, wherein the memory is configured to store an instruction, which when executed by the at least one processor, enables the apparatus to perform:
   determining a status of a data service switch of user equipment (UE), the status of the data service switch indicates that the data service switch is turned on or that the data service switch is turned off;
   receiving a data packet to be transmitted to the UE;
   determining whether the data packet belongs to a specified type when the status of the data service switch indicates that the data service switch is turned off;
   forwarding the data packet if the data packet belongs to the specified type; and
   transmitting a charging data record (CDR) generated according to the data packet to a charging system, wherein the CDR comprises indication information notifying the charging system that the data service switch of the UE is turned off.

7. The apparatus according to claim 6, wherein the determining whether the data packet belongs to a specified type comprises:
   determining whether the data packet is a downlink data packet from a PDN network corresponding to an IP multimedia subsystem access point name (IMS APN).

8. The apparatus according to claim 7, wherein determining whether the data packet is the data packet of a specified service type comprises:
   performing deep packet inspection (DPI) on the data packet, and determining whether the data packet is the data packet of the specified service type.

9. The apparatus according to claim 6, wherein the apparatus is further enabled to perform:
   receiving a protocol configuration option (PCO) from the UE, wherein the PCO comprises data service switch status indication information indicating that the data service switch is turned on or that the data service switch is turned off.

10. A non-transitory computer-readable storage medium storing a program to be executed by at least one processor of a device, the program including instructions to cause the device to carry out the following operations:
    determining a status of a data service switch of user equipment (UE), the status of the data service switch indicates that the data service switch is turned on or that the data service switch is turned off;
    receiving a data packet to be transmitted to the UE;
    determining whether the data packet belongs to a specified type when the status of the data service switch indicates that the data service switch is turned off;
    forwarding the data packet if the data packet belongs to the specified type; and
    transmitting a charging data record (CDR) generated according to the data packet to a charging system, wherein the CDR comprises indication information which notifies the charging system that the data service switch of the UE is turned off.

11. The non-transitory computer-readable storage medium according to claim 10, wherein the determining whether the data packet belongs to a specified type comprises:
    determining whether the data packet is a downlink data packet from a PDN network corresponding to an IP multimedia subsystem access point name (IMS APN).

12. The non-transitory computer-readable storage medium according to claim 10, wherein the operation further comprises:
    receiving a protocol configuration option (PCO) from the UE, wherein the PCO comprises data service switch status indication information indicating that the data service switch is turned on or that the data service switch is turned off.

13. A data service control method, comprising:
    determining, by a packet data network (PDN) gateway (PGW), a status of a data service switch of user equipment (UE), wherein the status of the data service switch indicates that the data service switch is turned on or that the data service switch is turned off;
    receiving, by the PGW, a data packet that be transmitted to the UE;
    determining, by the PGW, whether the data packet belongs to a specified type when the status of the data service switch indicates that the data service switch is turned off;
    forwarding, by the PGW, the data packet if the data packet belongs to the specified type;
    transmitting, by the PGW, a charging data record (CDR) generated according to the data packet to a charging system, wherein the CDR comprises indication information notifying the charging system that the data service switch of the UE is turned off;
    receiving, by the charging system, the CDR; and
    charging, by the charging system, the data packet according to the indication information.

14. The method according to claim 13, wherein determining, by the PGW, whether the data packet belongs to a specified type comprises:
    determining, by the PGW, whether the data packet is a downlink data packet from a PDN network corresponding to an IP multimedia subsystem access point name (IMS APN).

15. The method according to claim 13, further comprising:
    receiving, by the PGW, a protocol configuration option (PCO) from the UE, wherein the PCO comprises data service switch status indication information indicating that the data service switch is turned on or that the data service switch is turned off.

16. A communication system, comprising a packet data network (PDN) gateway (PGW) and a charging system,
    wherein the PGW is configured to
    determine a status of a data service switch of user equipment (UE), wherein the status of the data service switch indicates that the data service switch is turned on or that the data service switch is turned off;
    receive a data packet to be transmitted to the UE;
    determine whether the data packet belongs to a specified type when the status of the data service switch indicates that the data service switch is turned off;
    forward the data packet if the data packet belongs to the specified type;
    transmit a charging data record (CDR) generated according to the data packet to a charging system, wherein the CDR comprises indication information notifying the charging system that the data service switch of the UE is turned off;
    the charging system is configured to
    receiving the CDR; and
    charging the data packet according to the indication information.

17. The communication system according to claim 16, wherein the PGW is configured to determine whether the data packet is a downlink data packet from a PDN network corresponding to an IP multimedia subsystem access point name (IMS APN).

18. The communication system according to claim 16, wherein the PGW is further configured to receive a protocol configuration option (PCO) from the UE, the PCO comprises data service switch status indication information indicating that the data service switch is turned on or that the data service switch is turned off.

* * * * *